(12) United States Patent
Thakur et al.

(10) Patent No.: US 12,291,947 B2
(45) Date of Patent: May 6, 2025

(54) HYDROCARBON FLOW AVATAR

(71) Applicant: Schlumberger Technology Corporation, Sugar Land, TX (US)

(72) Inventors: Ram Kinkar Thakur, Houston, TX (US); Vivek Kumar Singh, Asker (NO); Glen Lillehammer, Stavanger (NO); Niels Kueck, Lysaker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/458,310

(22) Filed: Aug. 30, 2023

(65) Prior Publication Data

US 2024/0076969 A1 Mar. 7, 2024

Related U.S. Application Data

(60) Provisional application No. 63/374,392, filed on Sep. 2, 2022.

(51) Int. Cl.
*E21B 43/12* (2006.01)
*E21B 47/10* (2012.01)
*G06F 30/28* (2020.01)
*G06F 113/08* (2020.01)

(52) U.S. Cl.
CPC .............. *E21B 43/12* (2013.01); *E21B 47/10* (2013.01); *G06F 30/28* (2020.01); *E21B 2200/20* (2020.05); *G06F 2113/08* (2020.01)

(58) Field of Classification Search
CPC ...... E21B 43/12; E21B 47/10; E21B 2200/20; E21B 43/013; E21B 43/14; E21B 43/16; E21B 47/003; G06F 30/28; G06F 2113/08

See application file for complete search history.

(56) References Cited

U.S. PATENT DOCUMENTS

| | | | |
|---|---|---|---|
| 2009/0198478 A1* | 8/2009 | Cuevas | G06F 30/13 703/10 |
| 2011/0224835 A1* | 9/2011 | Stenhaug | E21B 37/00 700/282 |
| 2012/0232859 A1* | 9/2012 | Pomerantz | G01V 1/282 703/2 |
| 2014/0006111 A1* | 1/2014 | Priyesh | G01V 20/00 705/7.36 |
| 2016/0186533 A1* | 6/2016 | Donzier | E21B 43/01 702/6 |
| 2017/0364043 A1 | 12/2017 | Ganti et al. | |
| 2020/0182036 A1* | 6/2020 | Rangarajan | G06N 3/08 |
| 2020/0227178 A1 | 7/2020 | Lombardi et al. | |
| 2020/0242497 A1* | 7/2020 | Shahkarami | G06N 20/00 |
| 2022/0003229 A1 | 1/2022 | Mu et al. | |

OTHER PUBLICATIONS

Search Report and Written Opinion of International Patent Application No. PCT/US2023/073134 dated Nov. 28, 2023, 10 pages.

* cited by examiner

*Primary Examiner* — Catherine T. Rastovski
*Assistant Examiner* — Sharad Timilsina
(74) *Attorney, Agent, or Firm* — Jeffrey D. Frantz

(57) ABSTRACT

A flow assurance digital avatar is provided that combines the simulation of fluid flow through a network of oilfield facilities including reservoirs, wells and pipelines, detection and visualization of possible flow-related issues and risks in the network of oilfield facilities, user evaluation of possible optimizations (what-if scenarios) in the operation of the network of oilfield facilities for fixes and workovers with respect to flow-related issues and risks, and user evaluation and management of possible tasks or actions for the fixes and workovers for the flow-related issues and risks. Other aspects are described and claimed.

20 Claims, 37 Drawing Sheets

FIG. 15

MODEL MANAGEMENT
NETWORK OKLAHOMA

▽ CONFIGURATION & CONTROL

OPTIMIZATION OBJECTIVE:
MAXIMIZE OIL RATE ▽

IGNORE GLOBAL CONSTRAINTS ◯
IGNORE LOCAL CONSTRAINTS ◯

CONTROL VARIABLES:
CHOKE BEAN SIZE
GAS LIFT RATE
ESP FREQUENCY
PCP SPEED

OPTIMIZATION TARGET:
INJECTION GAS RATE ▽
POWER ▽
LIQUID RATE ▽

▽ CONSTRAINTS

GLOBAL | WELLS | FLOWLINES/SINKS

| WELL | ALLOW ON/OFF | WELL CONTRIBUTION | CONTROL PARAMETER | | | | DUAL STRING | MAX CHP (PSIA) | POWER (HP) | | MAX DD | MIN BUBBLE POINT PRESSURE MARGIN (PSI) | MAX EVR | MAX VELOCITY (FT/S) |
|---|---|---|---|---|---|---|---|---|---|---|---|---|---|---|
| | | | PARAMETER | UNIT | MIN | MAX | | | MIN | MAX | | | | |
| WELL 1 | X | X | GAS LIFT RATE | MMSCFD | | | WELL 8 | 1200 | | | | | 1 | |
| WELL 2 | X | X | ESP FREQUENCY | HZ | | | | | | 20 | | | 1 | |
| WELL 3 | X | X | PCP SPEED | RPM | | | | | | 30 | | | 1 | |
| WELL 4 | X | X | CHOKE BEAN SIZE | 64TH IN | | | | | | | | | 1 | |
| WELL 5 | X | X | NONE | - | | | | | | | | | 1 | |
| WELL 6 | X | | GAS LIFT RATE | MMSCFD | | | | | | | | | | |
| WELL 7 | X | X | ESP FREQUENCY | HZ | | | | | | | | | 1 | |
| WELL N | X | X | PCP SPEED | RPM | | | | | | | | | 1 | |

MODEL MANAGEMENT
NETWORK OKLAHOMA

▽ CONFIGURATION & CONTROL

OPTIMIZATION OBJECTIVE:
MAXIMIZE OIL RATE ▽
IGNORE GLOBAL CONSTRAINTS
IGNORE LOCAL CONSTRAINTS

CONTROL VARIABLES:
CHOKE BEAN SIZE
GAS LIFT RATE
ESP FREQUENCY
PCP SPEED

OPTIMIZATION TARGET:
INJECTION GAS RATE ▽
POWER ▽
LIQUID RATE ▽

▽ CONSTRAINTS

GLOBAL  WELLS  FLOWLINES/SINKS

| COMPONENT | TYPE | LIQUID RATE (BBL/D) | | GAS RATE (MMSCFD) | | MAX WATER RATE (BBL/D) | MAX OIL RATE (BBL/D) | MAX GOR (SCF/BBL) | MAX EVR | MAX VELOCITY (FT/S) | MAX CO2 (MOLE.F) | MAX H2S (MOLE.F) |
|---|---|---|---|---|---|---|---|---|---|---|---|---|
| | | MIN | MAX | MIN | MAX | | | | | | | |
| FLOWLINE 1 | FLOWLINE | | | | | | | | | | | |
| FLOWLINE 2 | FLOWLINE | | | | | | | | | 1.00 | | |
| FLOWLINE 3 | FLOWLINE | | | | | | | | | | | |
| EXPORT_LINE | FLOWLINE | | | | | | | | | | | |
| SINK 1 | SINK | | | | | | | | | | | |
| SINK 2 | SINK | | | | | | | | | | | |

FIG. 21

NETWORK 4
OIL/PRODUCTION    [SUBSCRIBED]  [SHOW ON MAP]      OVERVIEW SCENARIOS INSIGHTS TASKS ABOUT   ✕

CONFIGURATION  OPPORTUNITIES  RECOMMENDATION

| PRE-OPTIMIZED<br>SIMULATED AT 19:00<br>ON 27 FEB 2020 | | OPTIMIZED (S)<br>SYSTEM CONFIGURATION | | OPTIMIZED (U1)<br>USER CONFIGURATION | | OPTIMIZED (U2)<br>USER CONFIGURATION | |
|---|---|---|---|---|---|---|---|
| OPTIMIZATION OBJECTIVE | — | OPTIMIZATION OBJECTIVE | MAXIMIZE OIL | OPTIMIZATION OBJECTIVE | MINIMIZE GAS | OPTIMIZATION OBJECTIVE | MAXIMIZE OIL |
| AVAILABLE LIFT GAS (MMSCFD) | 12.26 | AVAILABLE LIFT GAS (MMSCFD) | 15 | AVAILABLE LIFT GAS (MMSCFD) | 10 | AVAILABLE LIFT GAS (MMSCFD) | 20 |
| AVAILABLE PUMP POWER (HP) | 118.43 | AVAILABLE PUMP POWER (HP) | 120 | AVAILABLE PUMP POWER (HP) | 100 | AVAILABLE PUMP POWER (HP) | 150 |
| LIQUID HANDLING CAPACITY (BBL/DAY) | 63455.24 | LIQUID HANDLING CAPACITY (BBL/DAY) | 65000 | LIQUID HANDLING CAPACITY (BBL/DAY) | 60000 | LIQUID HANDLING CAPACITY (BBL/DAY) | 70000 |
| WATER HANDLING CAPACITY (BBL/DAY) | 13224.23 | WATER HANDLING CAPACITY (BBL/DAY) | 15000 | WATER HANDLING CAPACITY (BBL/DAY) | 18000 | WATER HANDLING CAPACITY (BBL/DAY) | 17000 |
| GAS HANDLING CAPACITY (MMSCFD) | 16.67 | GAS HANDLING CAPACITY (MMSCFD) | 20 | GAS HANDLING CAPACITY (MMSCFD) | 25 | GAS HANDLING CAPACITY (MMSCFD) | 22 |

[VIEW FULL CONFIGURATION]       [RUN OPTIMIZATION]

FIG. 22

NETWORK 4
OIL/PRODUCTION

[SUBSCRIBED] [SHOW ON MAP]            OVERVIEW  SCENARIOS  INSIGHTS  TASKS  ABOUT   X

CONFIGURATION  OPPORTUNITIES  RECOMMENDATION

| PRE-OPTIMIZED<br>SIMULATED AT 19:00<br>ON 27 FEB 2020 | | OPTIMIZED (S)<br>SYSTEM CONFIGURATION | | OPTIMIZED (U1)<br>USER CONFIGURATION | |
|---|---|---|---|---|---|
| OPTIMIZATION OBJECTIVE | — | OPTIMIZATION OBJECTIVE | MAXIMIZE OIL | OPTIMIZATION OBJECTIVE | MINIMIZE GAS |
| AVAILABLE LIFT GAS (MMSCFD) | 12.26 | AVAILABLE LIFT GAS (MMSCFD) | 15 | AVAILABLE LIFT GAS (MMSCFD) | 10 |
| AVAILABLE PUMP POWER (HP) | 118.43 | AVAILABLE PUMP POWER (HP) | 120 | AVAILABLE PUMP POWER (HP) | 100 |
| LIQUID HANDLING CAPACITY (BBL/DAY) | 63455.24 | LIQUID HANDLING CAPACITY (BBL/DAY) | 65000 | LIQUID HANDLING CAPACITY (BBL/DAY) | 60000 |
| WATER HANDLING CAPACITY (BBL/DAY) | 13224.23 | WATER HANDLING CAPACITY (BBL/DAY) | 15000 | WATER HANDLING CAPACITY (BBL/DAY) | 18000 |
| GAS HANDLING CAPACITY (MMSCFD) | 16.67 | GAS HANDLING CAPACITY (MMSCFD) | 20 | GAS HANDLING CAPACITY (MMSCFD) | 25 |

[VIEW FULL CONFIGURATION]

CONFIGURATION DATA

| CURRENCY | [ ] ▽ |
|---|---|
| OPERATIONAL | |
| OIL PRICE, $/BBL | 60 |
| GAS PRICE, $/MMSCF | 4000 |
| GAS BEQ, BBL/MMSCF | 167 |
| LIFT COST, $/BBL | 17 |
| RISK RELATIVE WEIGHTAGE | ⋀ |
| EROSION RISK | 20 |
| CORROSION RISK | 20 |
| LIQUID LOADING RISK | 20 |
| HYDRATE RISK | 20 |
| WAX RISK | 20 |
| RISK KPI LIMITS (MIN | MAX) | |
| EVR | 0.9 | 2.0 |
| CORR. RATE, MM/YR | 0.0 | 35.0 |
| LLVR | 0.9 | 2.0 |
| HYD. DT, DEGF | 0.0 | 50 |
| WAX. DT, DEGF | 0.0 | 50 |

PRIMARY USE CASES

| # | USE CASES | HOW TO COMPUTE/AGGREGATE RISK KPI | CONSUMPTION | REMARKS |
|---|---|---|---|---|
| A | A USER WANTS TO KNOW EROSION STATE OF A SPECIFIC WELL OR FLOWLINE | TRACK EROSION KPI AND PICK THE WORST VALUE (MAX EVR) ANYWHERE IN THE FLOWLINE. | ○ NETWORK RESULT TABLE | REPEAT THIS FOR ALL TYPES OF FLOW ASSURANCE ISSUES |
| B | A USER WANTS TO KNOW EROSION STATE OF THE WHOLE NETWORK | COMPUTE SIMPLE AVERAGE OF MAX EVR ACROSS FLOWLINES AND WEIGHT AVERAGE (BY HYDRAULIC CAPACITY) OF MAX EVR FOR ALL FLOWLINES. CALCULATE NETWORK LEVEL EVR AS WEIGHT AVERAGE (BY COUNT) OF FLOWLINES AND FLOWLINES. | ○ NETWORK INSIGHT | REPEAT THIS FOR ALL TYPES OF FLOW ASSURANCE ISSUES |
| C | A USER WANTS TO KNOW AGGREGATED FA RISK FOR A SPECIFIC NETWORK ELEMENT | AGGREGATE ALL AVAILABLE RISK TYPES (EROSION, CORROSION, ETC.) FOR A SPECIFIC NETWORK ELEMENT (FLOWLINE / FLOWLINE) | ○ NETWORK RESULT TABLE<br>○ OPTIMIZATION ACTION RANKING | |
| D | A USER WANTS TO KNOW OVERALL NETWORK LEVEL FA RISK. | COMPUTE NETWORK LEVEL RISK BY AGGREGATING ALL PREVAILING RISK TYPES ACROSS ALL NETWORK ELEMENTS. | ○ COLOR CODING OF NETWORK ICON.<br>○ NETWORK LIST PAGE (THROUGH PDF)<br>○ NETWORK OVERVIEW PAGE (TREND OF NETWORK AGGREGATED RISK OVER TIME)<br>○ OPTIMIZATION SCENARIO RANKING | |
| E | A USER WANTS TO SEE DISTRIBUTION OF AGGREGATED RISK ACROSS NETWORK ELEMENT | COMPUTE AGGREGATED RISK COMBINING ALL ISSUES TYPES FOR FLOWLINE AND FLOWLINE DATA POINTS. | ○ MAP VISUALIZATION | |

FIG. 29

USE CASE B

| WELL | QUALIFYING VALUE |
|---|---|
| WELL 1 | W1 |
| WELL 2 | W2 |
| WELL 3 | W3 |
| , | , |
| WELL W | WW |

WELL COUNT = W

FLOWLINE COUNT = F

SPECIFIC RISK ACROSS WHOLE NETWORK

| FLOWLINE | QUALIFYING VALUE | PIPE ID | PIPE LENGTH | CAPACITY |
|---|---|---|---|---|
| FLOWLINE 1 | F1 | D1 | L1 | C1 |
| FLOWLINE 2 | F2 | D2 | L2 | C2 |
| FLOWLINE 3 | F3 | D3 | L3 | C3 |
| , | , | | | |
| FLOWLINE W | FF | DF | LF | CF |

CALCULATE AVERAGE VALUE OF RISK KPI FOR THE WELL: 
$$W_{AV(i)} = \frac{W1 + W2 + W3 + \text{------} + WW}{W}$$ --- EQ-1

CALCULATE AVERAGE VALUE OF RISK KPI FOR THE FLOWLINE: 
$$F_{AV(i)} = \frac{F1 \cdot C1 + F2 \cdot C2 + F3 \cdot C3 + \text{------} + FF \cdot CF}{C1 + C2 + C3 + \text{------} + Cf}$$ --- EQ-2

CALCULATE AGGREGATED VALUE OF RISK KPI FOR THE NETWORK: 
$$N_{AV(i)} = \frac{W \cdot W_{AV(i)} + F \cdot F_{AV(i)}}{W + F}$$ --- EQ-3

CONVERT NETWORK RISK KPI FOR THE CONCERNED RISK TYPE TO EQUIVALENT SEVERITY, BASED ON LOOK UP TABLE AS INDICATED IN FIG. 31

APPLIES TO ALL ISSUE TYPES

FIG. 32

USE CASE C

AGGREGATED FA RISK FOR A SPECIFIC NETWORK ELEMENT

| WELL X | QUALIFYING VALUE |
|---|---|
| EVR | EW |
| LLVR | LW |
| R-CORR | CW |
| HYD-DT | HW |
| WAX-DT | WW |

| FLOWLINE X | QUALIFYING VALUE |
|---|---|
| EVR | EF |
| LLVR | LF |
| R-CORR | CF |
| HYD-DT | HF |
| WAX-DT | WF |

CALCULATE NOMINAL VALUES (NV) FOR EACH NETWORK ELEMENTS INDEPENDENTLY: REFER TO FIG.32

CALCULATE AGGREGATED SCORE FOR ANY ELEMENT ($E_{AR}$) BASED ON WEIGHT FACTOR OF VARIOUS RISK TYPE. (REFER TO FIG.32 FOR WEIGHTAGE, W)

WELL AGGREGATED RISK: $W_{AR(i)} = (NV * W)_{EVR} + (NV * W)_{LLVR} + (NV * W)_{R\text{-}CORR} + (NV * W)_{HYD\text{-}DT} + (NV * W)_{WAX\text{-}DT}$ — — EQ-6

FLOWLINE AGGREGATED RISK: $F_{AR(i)} = (NV * W)_{EVR} + (NV * W)_{LLVR} + (NV * W)_{R\text{-}CORR} + (NV * W)_{HYD\text{-}DT} + (NV * W)_{WAX\text{-}DT}$ — — EQ-7

CONVERT ELEMENT RISK KPI FOR THE CONCERNED ELEMENT, BASED ON LOOK UP TABLE AS INDICATED IN FIG. 32 / EQ-5

APPLIES TO ANY WELL / FLOWLINE

FIG. 34

HYDROCARBON FLOW AVATAR

CROSS-REFERENCE TO RELATED APPLICATIONS

This application claims priority to U.S. patent application Ser. No. 63/374,392 filed on 2 Sep. 2022, entitled "Hydrocarbon Flow Avatar", the contents of which are hereby incorporated by reference.

FIELD

The present disclosure relates to methods and systems that model the operation of oilfield equipment and facilities for operational surveillance, planning and management.

BACKGROUND

Oilfield operators typically evaluate flow-related issues and risks and plan for fixes or workovers to address these issues based on operational data that characterizes the current state of the oilfield. For large oilfield networks, the flow assurance issues can be complex, which makes it difficult to identify actions that address these issues and maximize the economic value and efficiency of the network.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure describes the implementation of a flow assurance digital avatar, referred to as a Hydrocarbon Flow Avatar or HCFA, that combines the simulation of fluid flow through a network of oilfield facilities including reservoirs, wells and pipelines, detection and visualization of possible flow-related issues and risks in the network of oilfield facilities, user evaluation of possible optimizations (what-if scenarios) in the operation of the network of oilfield facilities for fixes and workovers with respect to flow-related issues and risks, and user evaluation and management of possible tasks or actions for the fixes and workovers for the flow-related issues and risks. The HCFA can provide live state awareness of the network of oilfield facilities network and its component parts (high-resolution visual surveillance) and provide insights that can eliminate or minimize the flow-related issues and risks as well as providing opportunities to enhance production.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 6 to 26 depict graphical user windows and associated layouts and menus and interface elements that can be integrated as part of the hybrid mode graphical user interface (or another graphical user interface) of the Hydrocarbon Flow Avatar of FIG. 2;

FIGS. 29 and 30 are tables that depict the logical organization of the flow assurance risks related to the operation of a network(s) of oilfield facilities into five different use cases A to E;

FIG. 32 is a schematic diagram that depicts operations for characterizing flow assurance risks for a network for the use case B of FIGS. 29 and 30;

FIG. 34 is a schematic diagram that depicts operations for characterizing aggregated flow assurance risk across the different risk types for a particular element of the network for the use case C of FIGS. 29 and 30;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

It is to be understood that the present disclosure provides many different embodiments, or examples, for implementing different features of various embodiments. Specific examples of components and arrangements are described below to simplify the present disclosure. These are, of course, merely examples and are not intended to be limiting.

The present disclosure describes the implementation of a flow assurance digital avatar, referred to as a Hydrocarbon Flow Avatar or HCFA, that combines the simulation of fluid flow through a network of oilfield facilities including reservoirs and wells and pipelines, detection and visualization of possible flow-related issues and risks in the network of oilfield facilities, user evaluation of possible optimizations in the operation of the network of oilfield facilities for fixes and workovers with respect to flow-related issues and risks, and user evaluation and management of possible tasks or actions for the fixes and workovers for the flow-related issues and risks. The HCFA can provide live state awareness of the network of oilfield facilities network and its component parts (high-resolution visual surveillance) and provide insights that can eliminate or minimize the flow-related issues and risks as well as provides opportunities to enhance production.

Figure 1:
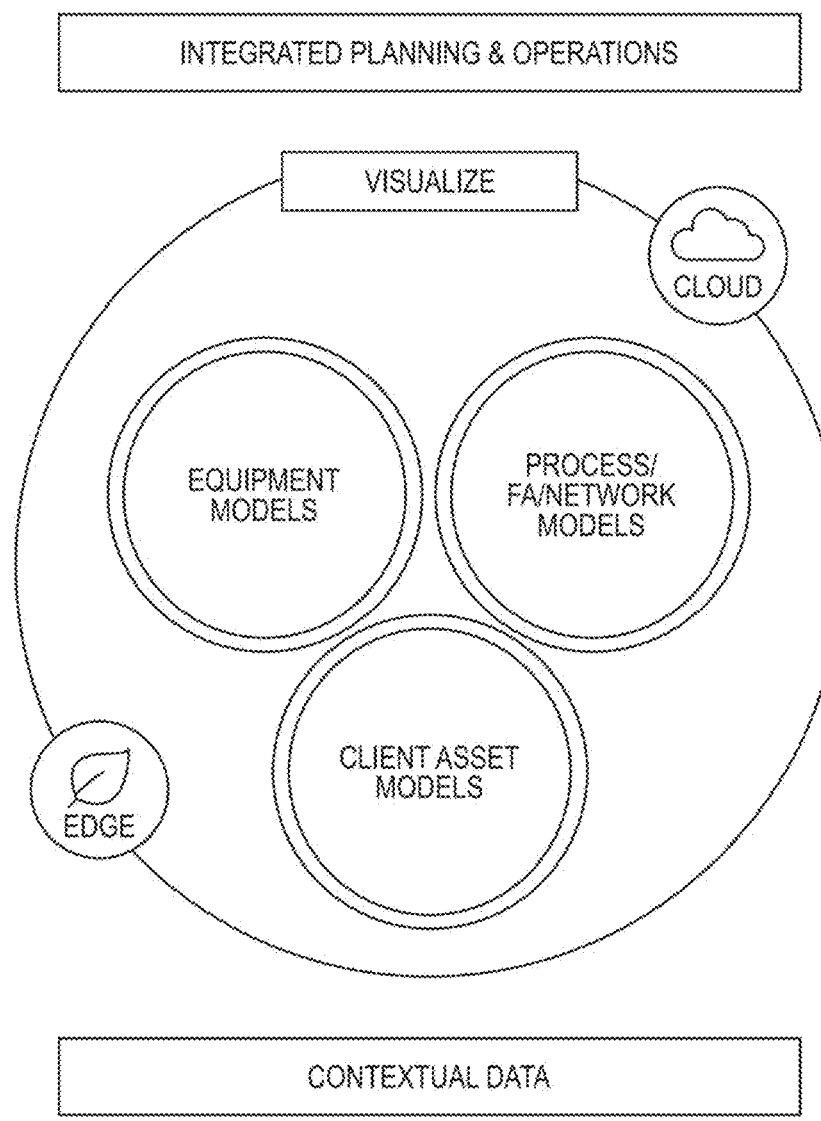
FIG. 1 is a schematic diagram of Integrated Planning & Operations for physical equipment, a process, or an asset.

In embodiments, the HCFA can build on Schlumberger's Digital Avatar vision by employing a digital twin that is a virtual representation of the behavior of physical equipment, a process, or an asset. The digital twin can be configured with capabilities to understand the current state of the physical equipment, process, or asset and predict future performance characteristics of the physical equipment, process, or asset, based on live sensor data. The digital twin exists throughout the entire life cycle of the physical equipment, process, or asset. The digital twin can form an essential element of Integrated Planning & Operations for the physical equipment, process, or asset as shown in FIG. 1.

The sensor data may be real-time sensor data. As used herein, 'real-time' refers to data that is passed along as it is gathered. The term 'real-time' as used in this application encompasses both substantially instantaneous data and data that is near real-time, but delayed due to, for example, data processing, network transmission, or other delays (sometimes referred to as 'near real-time').

Embodiments of the present invention may be generally employed in conjunction with an operating environment that includes one or more networks of oilfield facilities which include reservoirs, wells and subsurface flow devices, and surface facilities. The wells and subsurface flow devices may include, without limitation, completions, and associated devices such as inflow control devices and production tubing; and artificial lift equipment such as electrical submersible pumps, progressive cavity pumps, and sucker rod pumps. The surface facilities can include wellhead equipment such as choke valves and other surface valves; fluid processing equipment such as separators and heater treaters; and transport and storage facilities such as pumps, valves, pipelines, and tanks. The wells and subsurface flow devices and the surface facilities can include field sensors and field controllers in a manner well known to those skilled in the art. The field sensors measure various sub-surface and surface properties in the network of oilfield facilities, such as oil, gas, and water production rates measured by flow meters at various locations in the network of oilfield facilities, pressure and temperature measured by pressure and temperature sensors at various locations in the network of oilfield facilities, and possible fluid levels at various locations in the network of oilfield facilities. The field controllers can be configured to control the operation of the equipment in the network of oilfield facilities in a manual, semi-automatic, or fully automatic (or autonomous) mode of operation. In embodiments, some or all of the field sensors can be capable of taking continuous measurements for processing and use in monitoring and surveillance operations as well as for the control operations performed by the field controllers.

The sub-surface and surface properties in the network of oilfield facilities as measured by the field sensors can provide an indication of problems or issues related to flow assurance in the network of oilfield facilities. In the present disclosure, flow assurance refers to the flow of hydrocarbon streams from a reservoir to a designated facility or endpoint, which can be influenced by a wide range of flow-related issues, such as hydrate formation, wax formation, asphaltene formation, emulsion, foaming, scale formation, sand production, slugging, well corrosion or erosion, pipeline corrosion or erosion, and materials-related issues. The flow-related issues may differ according to whether the hydrocarbon being produced is oil or gas, but they coincide in some respects. For example, wax and asphaltene deposits are issues typically encountered in oil production, while hydrates formation is an issue typically encountered in gas production.

For example, during production from a gas condensate reservoir, the production of solids-free fluid may cause pipeline erosion in production tubing or in a surface-located pipeline if the fluid flow velocity exceeds a specific value.

In another example, slug flow can occur in multiphase flow, especially in offshore production facilities which include a seabed pipeline and a riser to a processing platform. The slug flow can cause pressure fluctuations which can upset the process conditions and cause inconsistent instrument sensing. Moreover, the slug flow can cause vibration, especially at vessel inlets, pipe bends, valves, and other flow restrictions. This can lead to equipment deterioration and operating problems.

In yet another example, hydrates can form under certain pressure and temperature conditions. Hydrate formation can partially or fully block the fluid flow in pipes, which results in backpressure on the wellhead or pipeline and reduced production. In the worst-case scenario, hydrates formation can stop the flow of produced fluid.

In another example, accumulated liquid in a pipeline can cause an increase in pressure drop. This drop can be translated as a loss in energy. This loss must be compensated for, resulting in higher costs. Moreover, accumulated water in a pipeline can increase the corrosion rate of the pipeline. This liquid accumulation is typically removed from the pipeline, using a pig. The pig is a solid sphere with a diameter slightly less than the pipe diameter. The pig is inserted into the pipeline and pushed, by some pressure source, to sweep the liquid ahead of it.

In embodiments, the HCFA of the present disclosure can employ one or more computational-based simulators for simulating fluid flow through the network of oilfield facilities, including fluid flow through the reservoir and into one or more wells and through the well(s) to surface facilities and through the surface facilities to one or more designated endpoints. The one or more computational-based simulators can store models (i.e., data objects) representing the elements (reservoirs, wells with completions, surface facilities such as flowlines, pipelines, production networks) of the network of oilfield facilities. One or more proxy models (or a proxy simulator) can be used as part of the simulator(s). For simulating fluid flow through the reservoir and into the well(s), the simulator can permit discretization of the reservoir using a structured grid (or possibly an unstructured grid) to accurately represent the geometry of the reservoir. Local grid refinements (a finer grid embedded inside of a coarse grid) can possibly be used to represent near-wellbore multiphase flow effects more accurately. The simulator(s) can employ finite-difference simulation which is based on three physical concepts: conservation of mass, isothermal fluid phase behavior, and the Darcy approximation of fluid flow through porous media. Other types of simulators such as finite element and streamline simulators can also be used. The simulator(s) can treat the reservoir fluids as a black oil and not consider changes in the composition of the hydrocarbons as the reservoir is produced, beyond the solution or evolution of dissolved gas in oil, or vaporization or dropout of condensate from gas. Alternatively, the simulator can calculate the PVT properties of oil and gas phases of the reservoir fluid once they have been fitted to an equation of state (EOS) as a mixture of components. The simulator then uses the fitted EOS equation to dynamically track the movement of both phases and components in the reservoir. For simulating fluid flow through the well(s) to the surface facilities and through the surface facilities to one or more endpoints, the simulator can employ three-phase mechanistic fluid modeling, heat transfer modeling, and possibly PVT modeling for the fluid flow.

The simulator can employ one or more models that represent reservoirs, wells, pipelines, production networks, and facilities. When calibrated with available measurement data, such models can be used to estimate fluid properties and various flow assurance issues and risks throughout the system. In embodiments, the simulator(s) may employ features of a commercially available modeling framework such as the PIPESIM™ framework marketed by Schlumberger Limited (Houston, Tex.). The PIPESIM™ framework includes components to model multiphase flow from a reservoir to a wellhead, components to account for artificial lift equipment including rod pumps, ESPs and gas lift and components that interlink with reservoir and process simulators such as the ECLIPSE™ reservoir simulation framework marketed by Schlumberger Limited (Houston, Tex.). The PIPESIM™ framework includes a nodal (e.g., network) model for modeling hydrocarbon streams produced from a well (and also injection streams into an injector well).

In embodiments, the simulator(s) can be configured and executed to predict and model fluid flow through the network of oilfield facilities over time based on certain action(s) or task(s) that will affect or control the facilities before actual taking or performing such action(s) or task(s). The simulation results of the simulator can provide a prediction of flow assurance issues or risks in the network of oilfield facilities that would result from the action(s) or task(s). In this manner, the simulation results can be part of one or more what-if scenarios for different action(s) or task(s), and the simulation results for the what-if scenarios can be evaluated to identify or recommend a set of action(s) or task(s) that will address one or more flow-related issues or risks and optimize the flow of produced hydrocarbons at the one or more designated endpoints in the network of oilfield facilities. The operator can then implement the recommended set of action(s) or task(s) if and when deemed appropriate.

Figure 2:
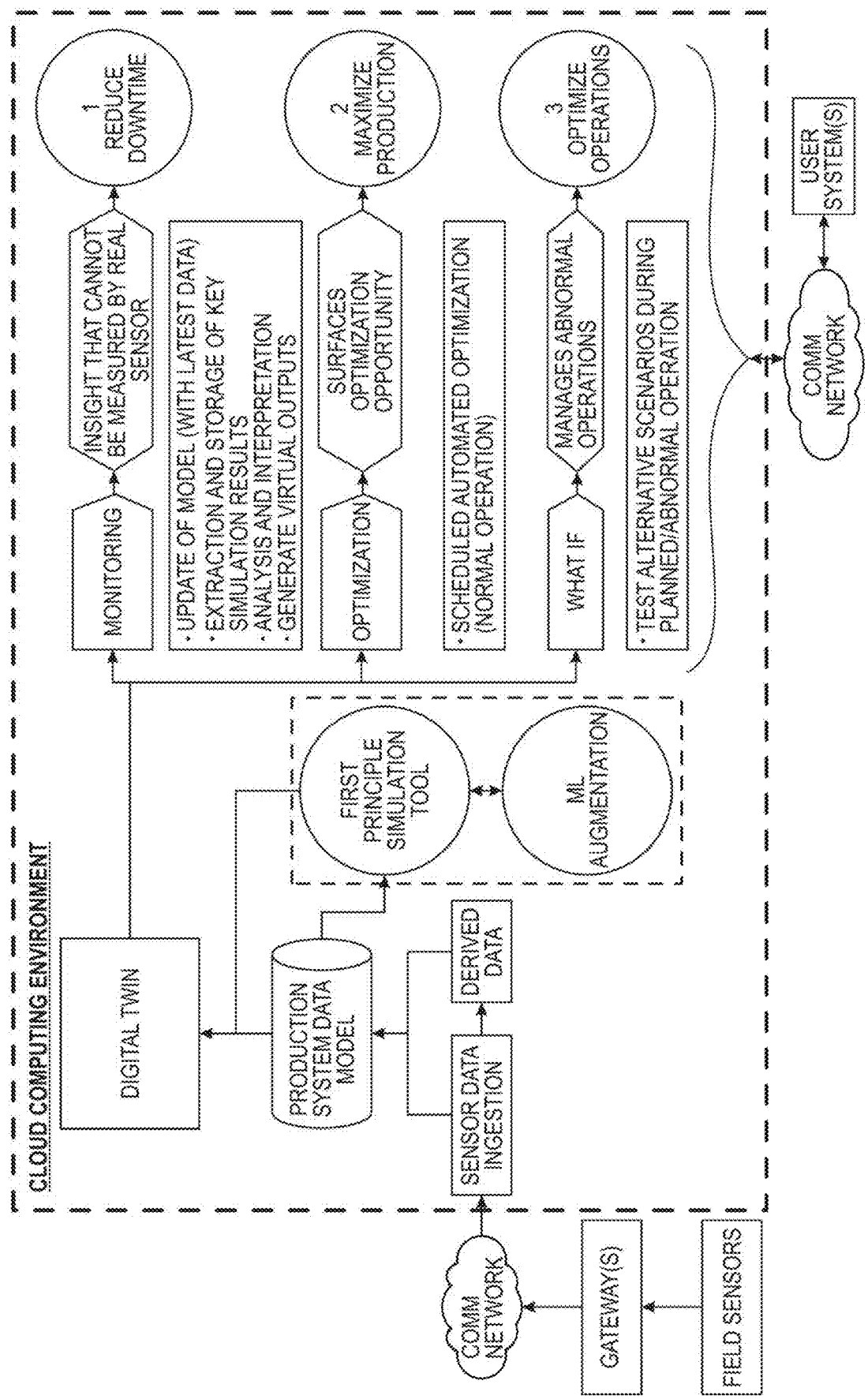
FIG. 2 is a schematic diagram of a cloud computing environment that implements a flow assurance digital avatar, Hydrocarbon Flow Avatar, or HCFA, or application, in accordance with an aspect of the present disclosure.

FIG. 2 shows a block diagram of an HCFA (or "application") according to an aspect of the present disclosure. The HCFA can be embodied by a cloud computing environment that includes a digital twin of one or more networks of oilfield facilities. The digital twin is constructed from a production system data model linked to live sensor data and data derived therefrom. The live sensor data is generated by field sensors at the one or more networks of oilfield facilities and supplied to one or more gateways that forward the live sensor data to the cloud computing environment via a data communication network (such as a local area network, wide area network, mobile access network or other access networks, and/or the Internet). The live sensor data is communicated to sensor data ingestion services of the HCFA for processing and input to the production system data model with the related derived data. The production system data model can be input to one or more simulators as described herein for simulating fluid flow through the one or more networks of oilfield facilities. The simulator can possibly use machine learning (ML) augmentation to provide an accurate virtual representation of the one or more networks of oilfield facilities. Data from the production system data model and the results of the simulator(s) can be input to the digital twin. User devices can communicate with the cloud computing environment via a data communication network (such as a local area network, wide area network, mobile access network or other access networks, and/or the Internet) to access the application to enable one or more authorized users to monitor the one or more networks of oilfield facilities over time based on an analysis and interpretation of key simulation results, thereby producing key insights that cannot be otherwise possible through real sensor measurements. The user devices can be a PC or desktop computer, a notebook, a tablet, a smartphone, or another suitable computing device. The application can also be accessed by the authorized user(s) to optimize the one or more networks of oilfield facilities based on current operational conditions and constraints. The application can also be accessed by authorized user(s) to plan and evaluate multiple what-if scenarios to manage normal and abnormal operations of the one or more networks of oilfield facilities. Advantageously, the application can enable an operator to reduce downtime or enhance uptime based on awareness of the system, maximize production through integrated optimizations, and optimize operation through systematic evaluation of scenarios to get to the best that is needed for a given situation.

In embodiments, the application can employ a graphical user interface that is intended to support automated end-to-end operation with minimal user intervention. The graphical user interface can also be configured to allow the user to interact with the application and influence the outcome of the application by adding user-specific configuration parameters.

Figure 3:
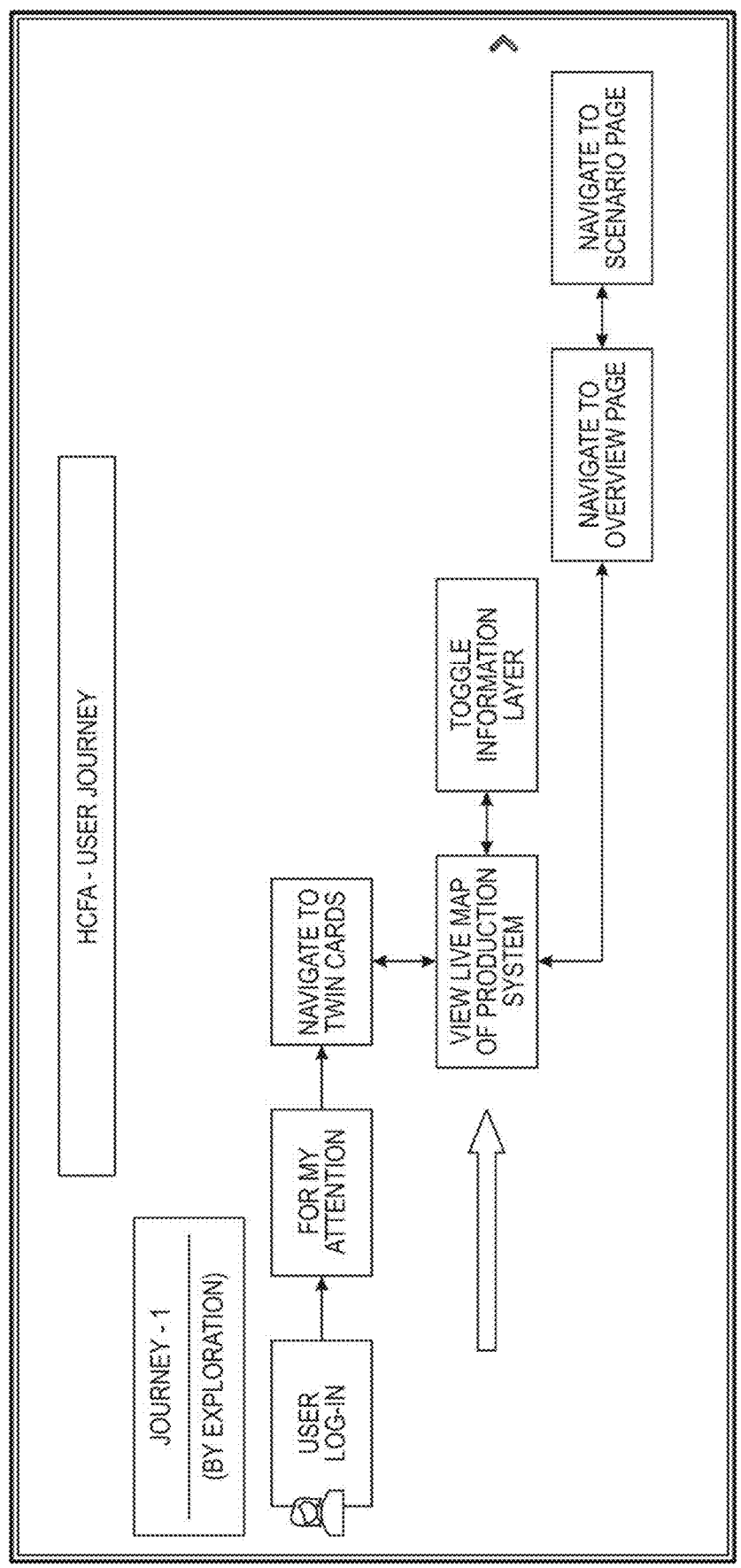
FIG. 3 depicts functionality that can be embodied by an exploratory mode implemented by a graphical user interface of the Hydrocarbon Flow Avatar of FIG. 2.

In embodiments, the graphical user interface of the application can employ an exploratory mode as shown in the schematic diagram of FIG. 3. In this mode, the user is logged into the application and can explore various components of the application before the user reaches the core of the application where the user can get the overview of the problem and the solution that the system is recommending.

Figure 4:
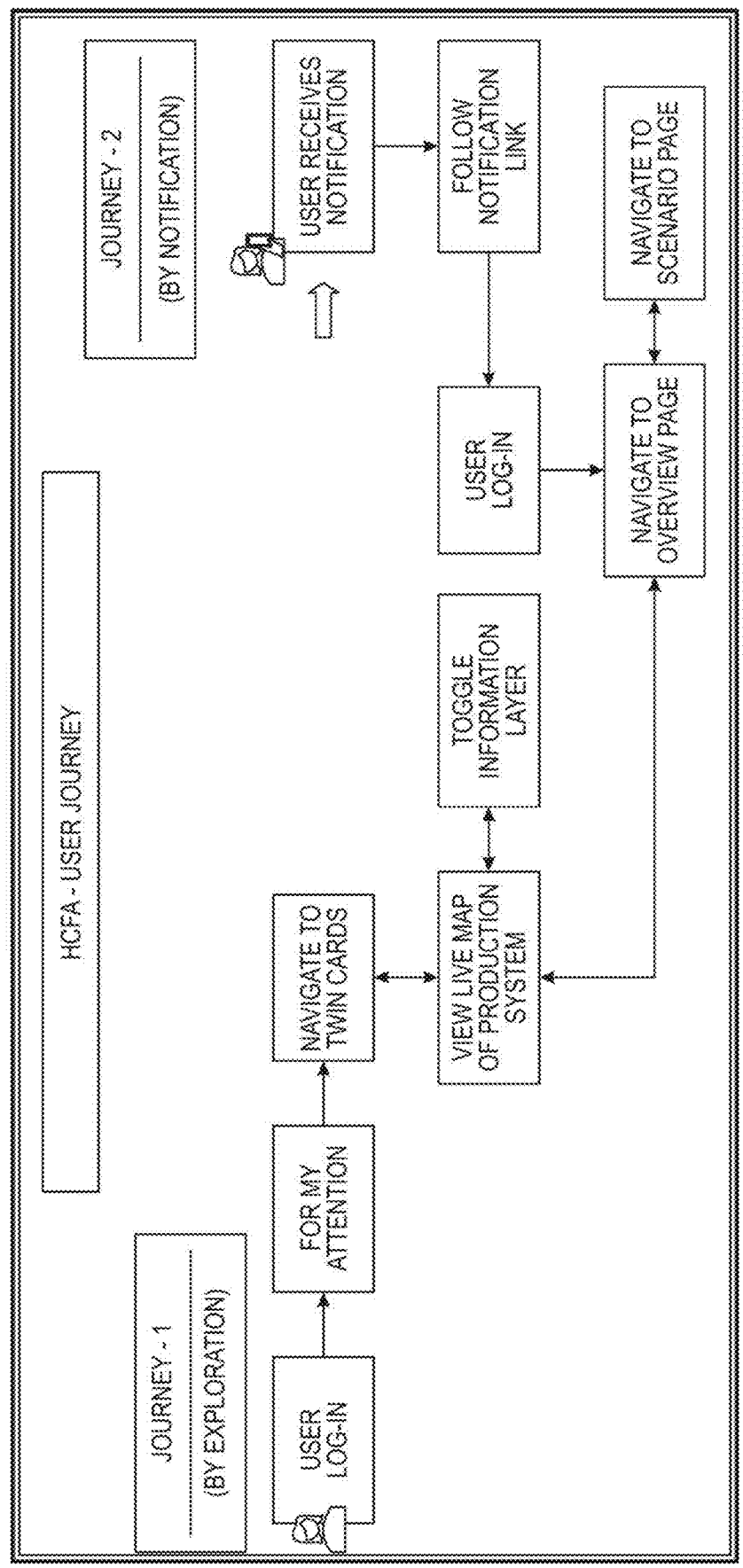
FIG. 4 depicts functionality that can be embodied by an alternate mode implemented by a graphical user interface of the Hydrocarbon Flow Avatar of FIG. 2.

In embodiments, the graphical user interface of the application can employ an alternative mode as shown in the schematic diagram of FIG. 4. In this mode, the user may not be logged into the system but receives a notification in the event of abnormality and then follows the link to reach the core of the issue and recommended solution.

Figure 5:
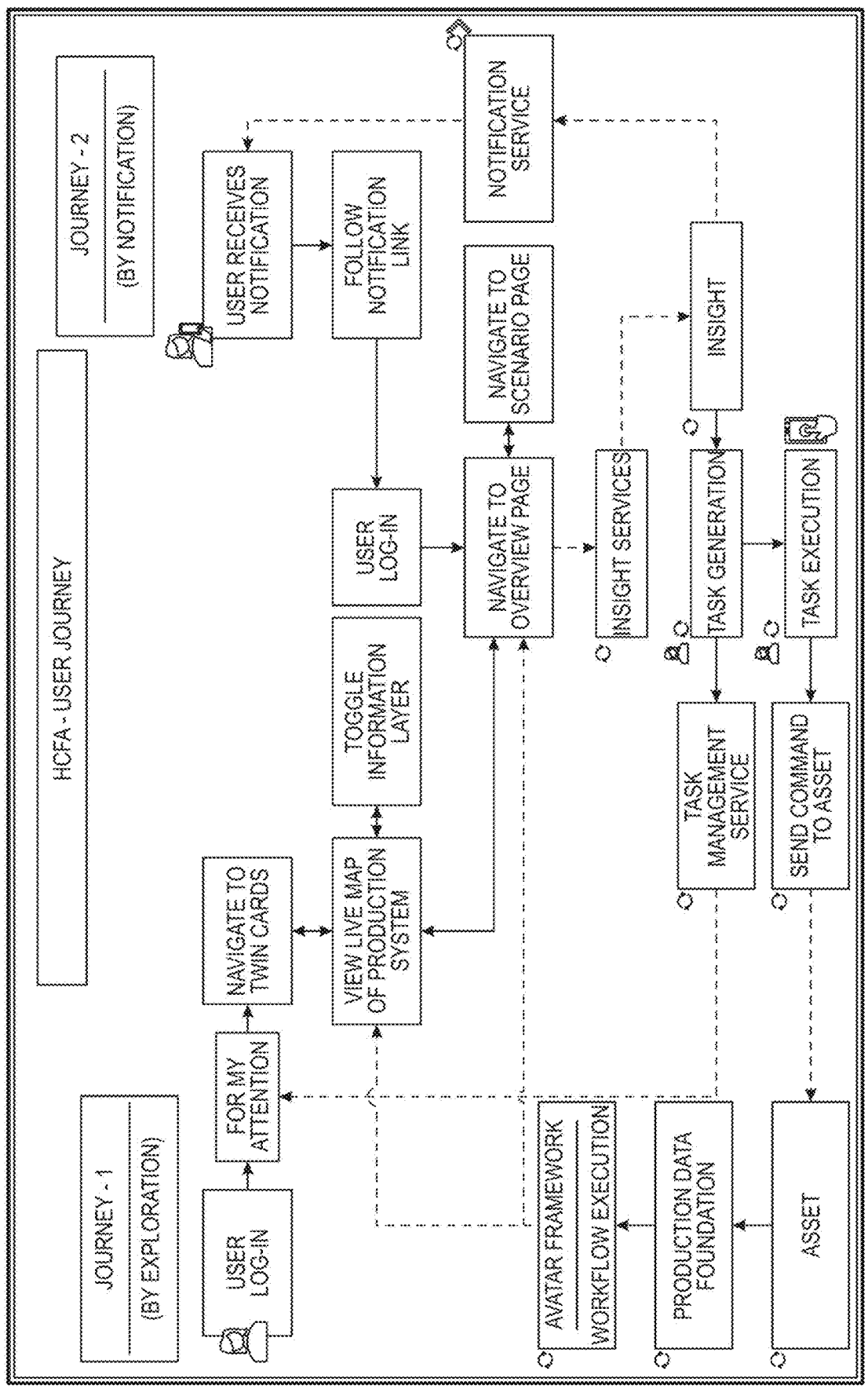
FIG. 5 depicts functionality that can be embodied by a hybrid mode implemented by a graphical user interface of the Hydrocarbon Flow Avatar of FIG. 2.

In embodiments, the graphical user interface of the application can employ a hybrid mode as shown in the schematic diagram of FIG. 5. The hybrid mode can be part of the exploratory mode (FIG. 3) or the alternative mode (FIG. 4). This mode employs an application framework which includes data management system and services enabled by production data foundation services, core services that provides an insight framework, notification services, task management services, and flow assurance services including model management and a model-based workflow engine.

The functionality of the hybrid mode can be described below with respect to the graphical user interfaces of FIGS. 6 to 26 for an example user X who is responsible for four different networks of oilfield facilities (which comprise four different networks of wells and pipelines) and has the responsibility to address any operational issue that may be associated with these four facilities. It is assumed that user X has received a notification message (for example, on his smartphone or another mobile device) that indicates an operational issue with one of the four facilities. For example, this issue could be related to excessive water production close to the water handling limit of a facility, production shortfall, or some other flow assurance issue. Knowing very well that the system is fully capable of automatically managing these concerns, user X decides to intervene and explore a few alternatives before planning and initiating corrective actions.

Figure 6:
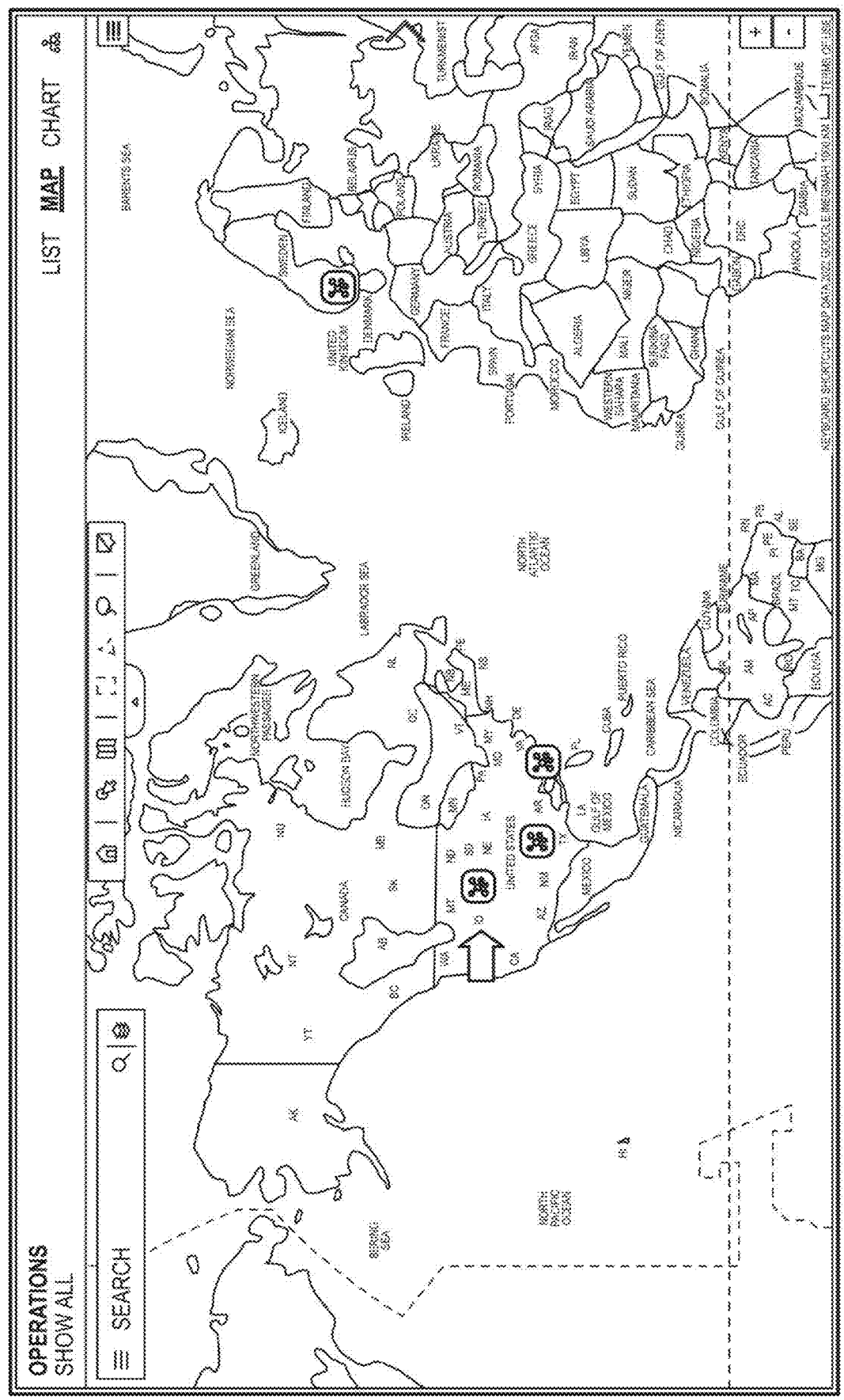

First, user X logs into the application and navigates to a high-level map view as shown in FIG. 6, which depicts a visual representation of all four facilities overlaid on a two-dimensional world map with colors indicating the operational state of these facilities. The operational state (color) can be based on a first factor representing how many wells are active. For example, if all wells were active then the factor score would be high. If some wells are not active then the factor score is penalized. The operational state can also be based on a second factor related to the difference between the actual production and the target production from the active wells. The operational state can also be based on a third factor related to flow assurance issues, e.g., erosion, corrosive fluids, etc. that are determined from the live sensor data.

Figure 7:
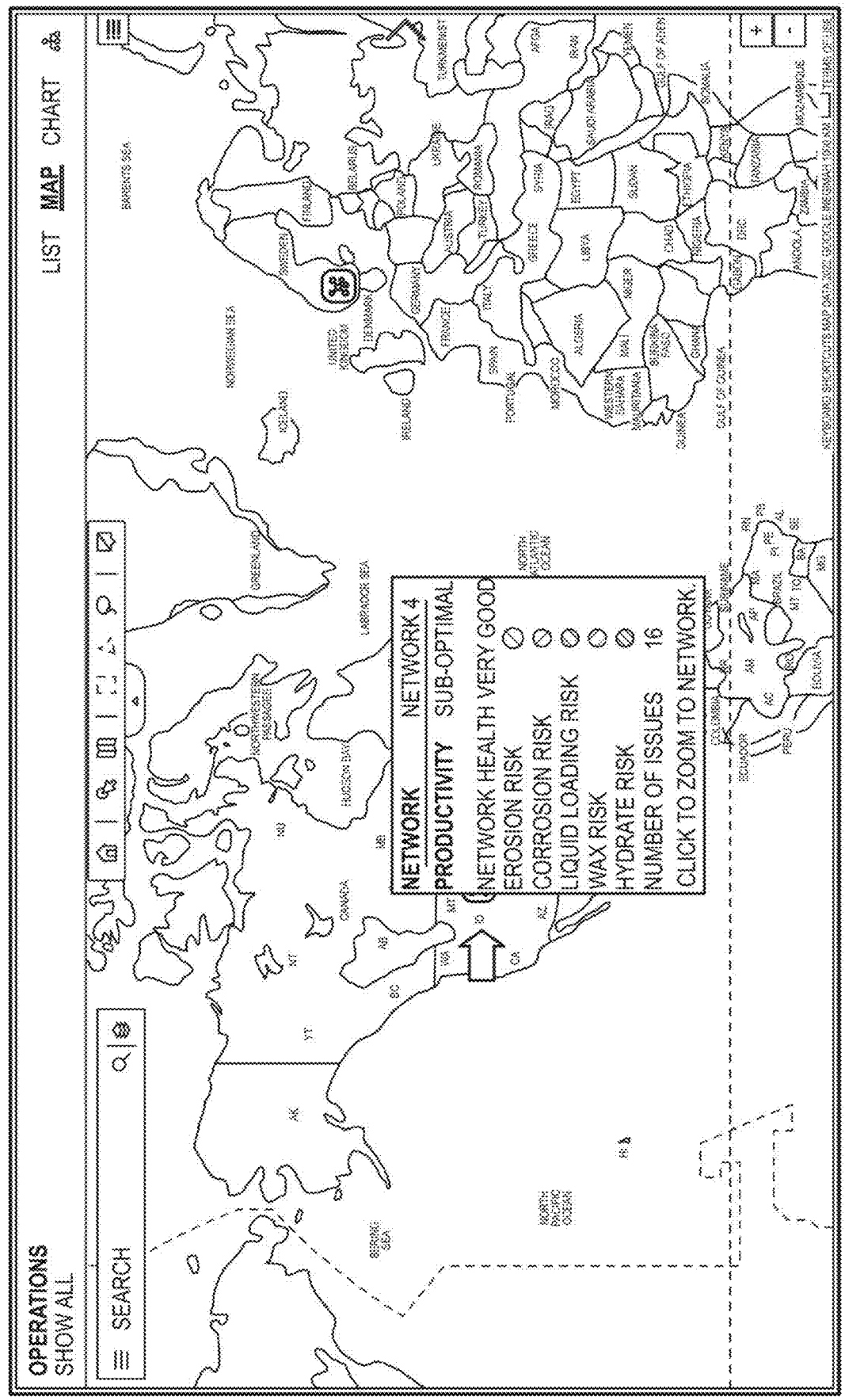
Figure 8:
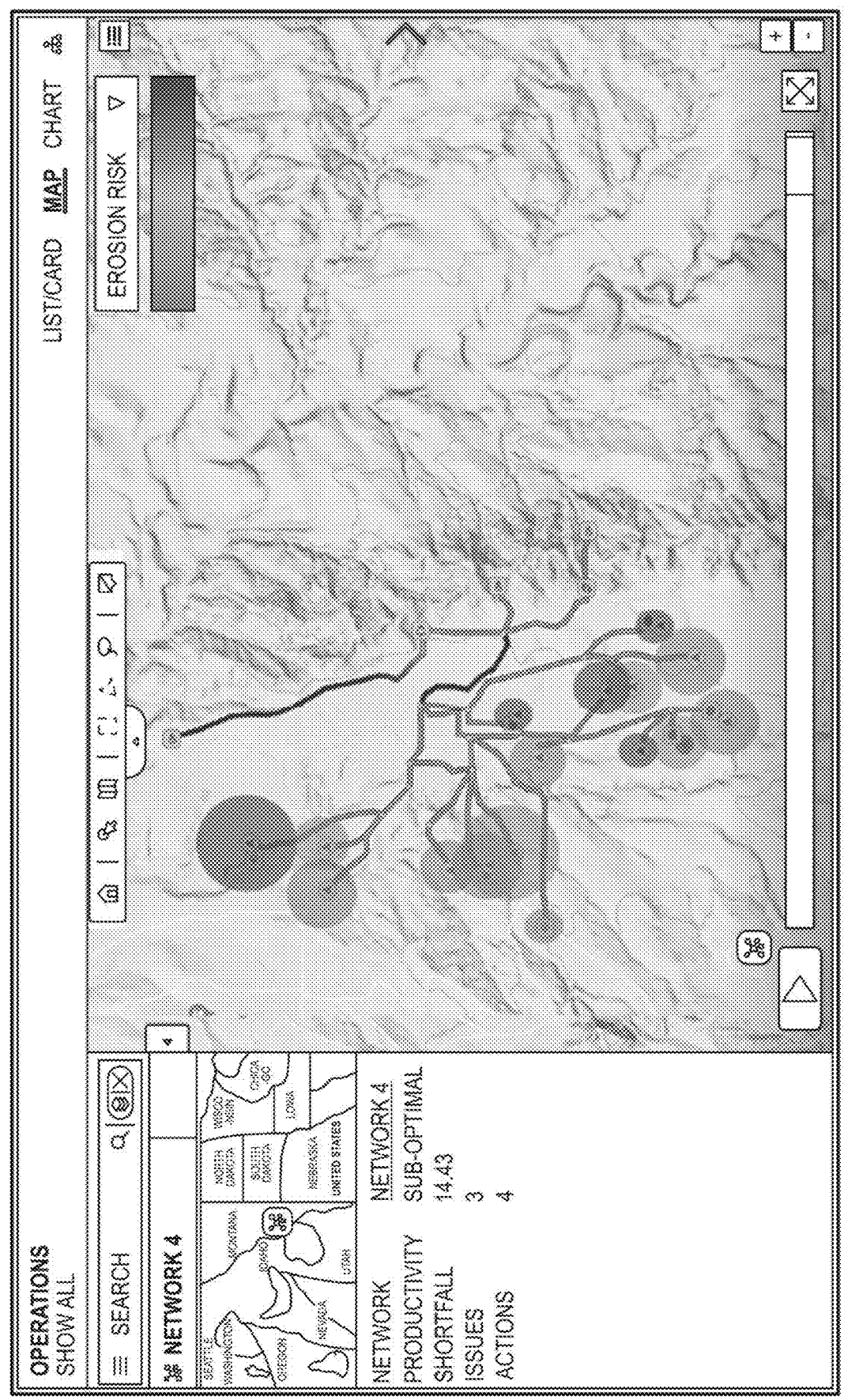

The user X can drill down into the yellow facility as shown in FIG. 7, which shows that the production state of the facility is sub-optimal with severe erosion risk. The user's immediate next objective is to get to know more. For example, user X may want to know more about the responsibilities of the wells and pipelines that contribute to the high-risk situation. To do so, user X can click on the asset icon to get a detailed view, which navigates user X to a zoomed view of the map as shown in FIG. 8. In the zoomed view of FIG. 8, user X is presented with a visual representation of the components of the facility along with layers of information in the form of color-coded gradient lines and bubbles showing various risk types. This zoomed view provides user X with access to a number (for example, 12 or more) of different hydraulic and flow assurance parameters of the facility.

Figure 9:
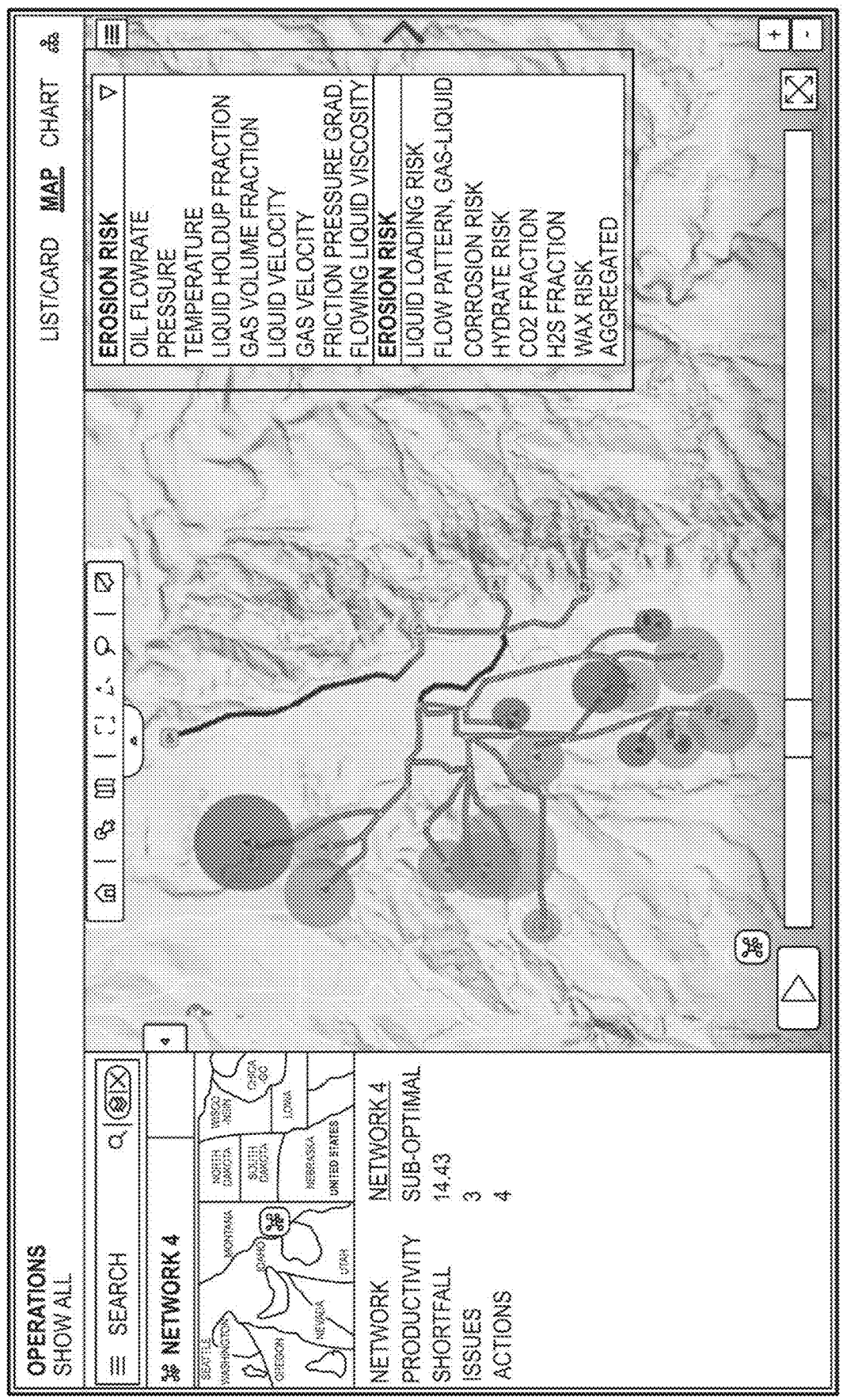
Figure 10:
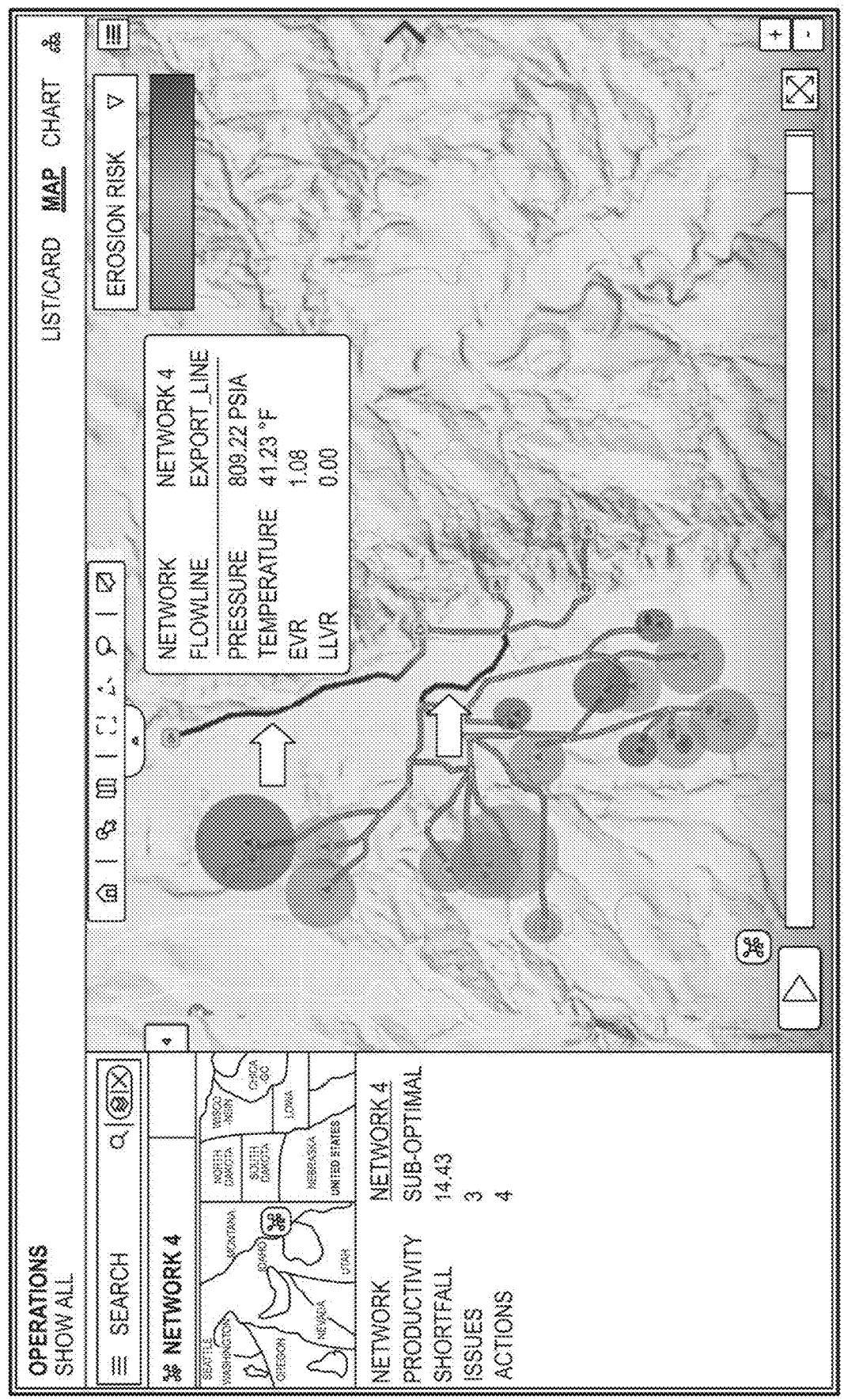

In FIG. 9, user X evaluates the layer for evaluating the erosion risk for the facility. This is the key risk identified earlier. Here, user X can use the time player to see how a given erosion risk has been developing over time. User X can identify a couple of flow lines having dark red color, whereby a mouseover indicates the extent of issue as shown in FIG. 10. Clearly the export line of the facility is showing severe erosion risk.

Figure 11:
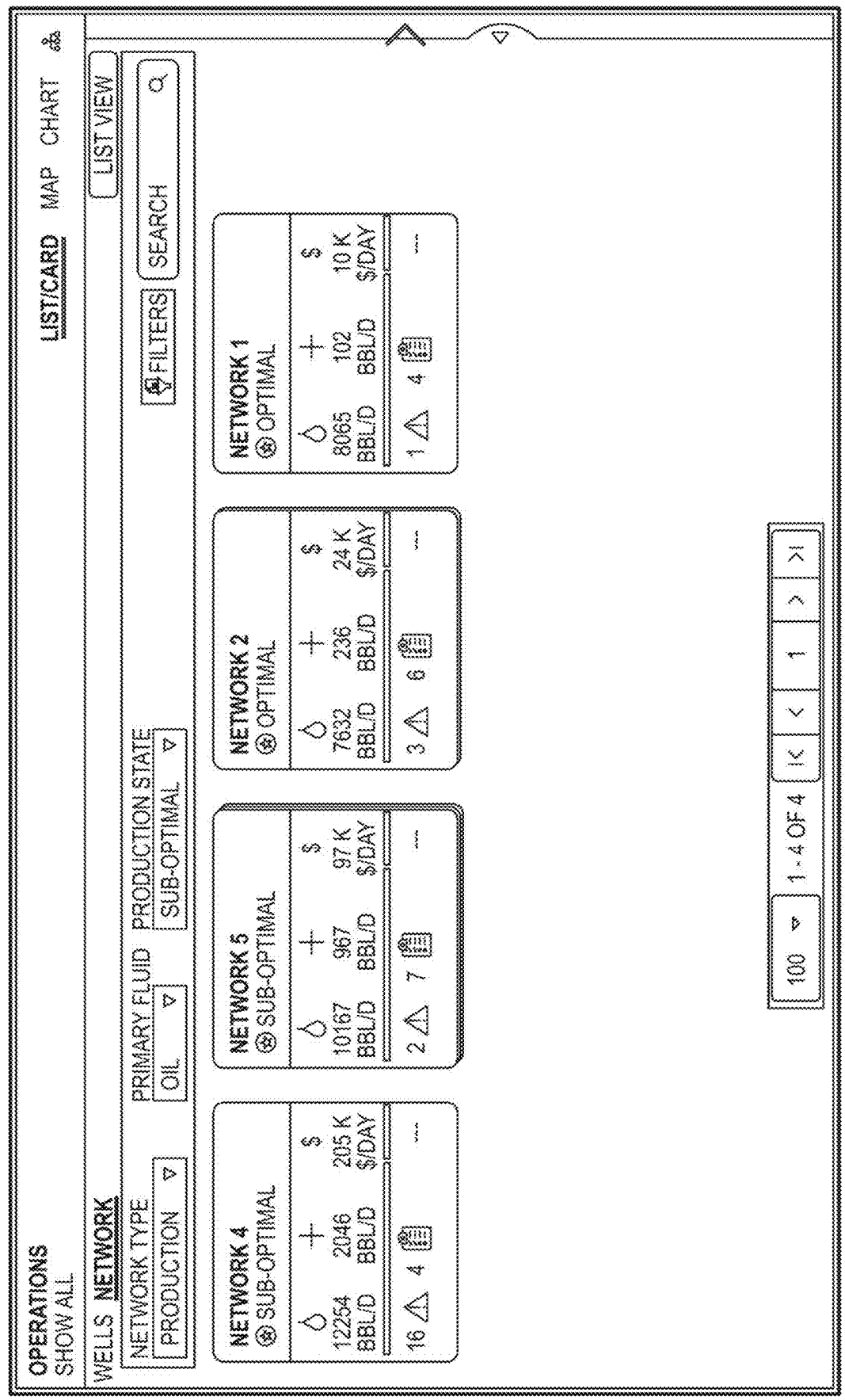

User X has the option to stop exploring and simply go to a recommendation page for specific actions identified by the application as shown in FIG. 11. In this case, the application is simultaneously analyzing all four facilities connected to it and presents a list of all these avatars along with key KPIs and other metadata that will allow the user to ascertain the operational state of these facilities sorted by magnitude of opportunities that may exist.

Figure 12:
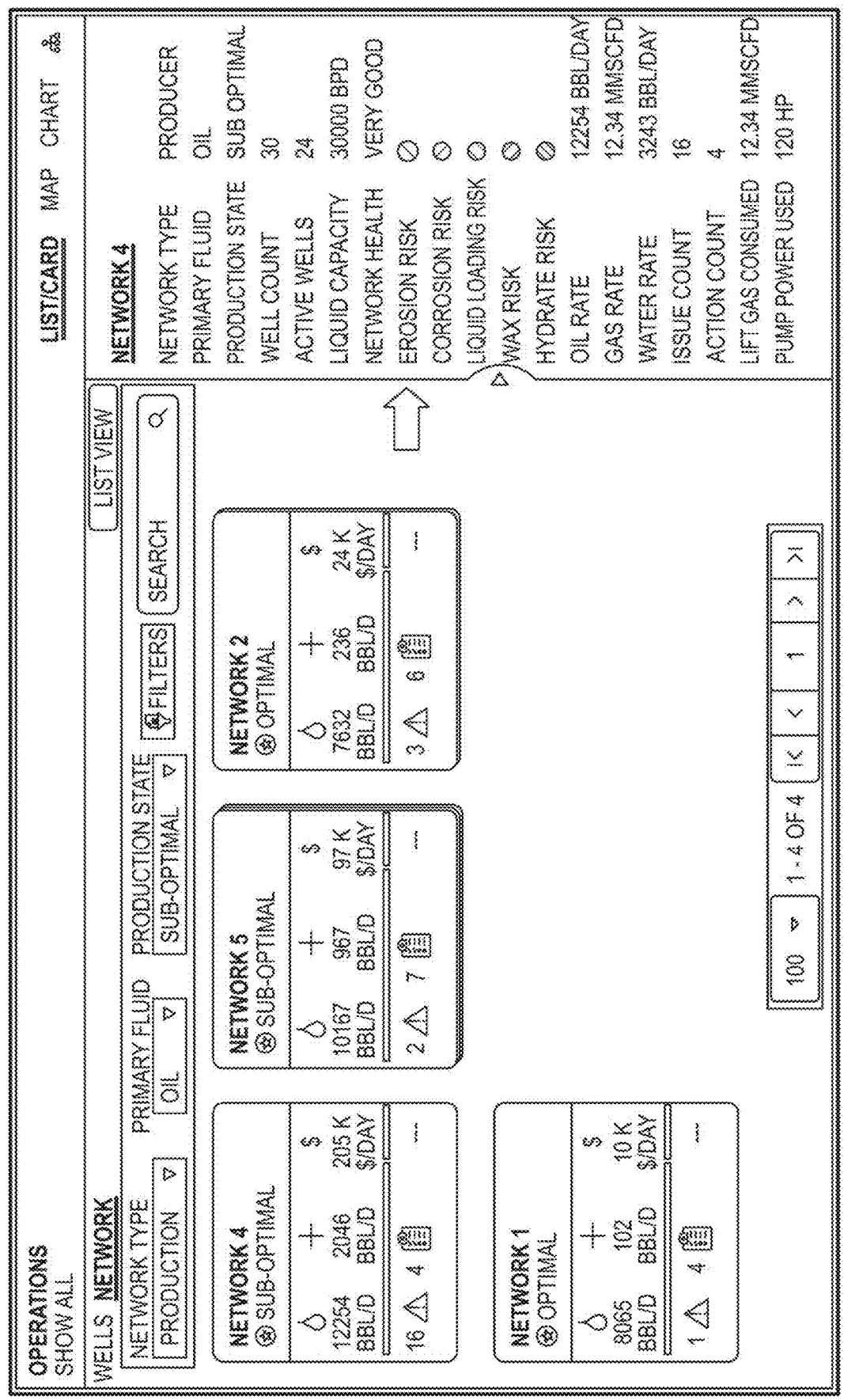

In the example recommendation page of FIG. 11, user X is presented with a collection of cards, each representing specific facilities and corresponding data based on a filtering schema that has been set here (top navigation of this screen). Each card presents information (e.g., current oil production per day) that allows user X to evaluate the current performance of the corresponding network as well as information (e.g., predicted oil production per day and predicted value per day) that allows user X to evaluate the performance of the corresponding network for a recommended optimization scenario. In this case, facility, or network 4, the first in the list here, is ranked at the top based on the value that it could generate being over 2K barrels of incremental oil. This is what user X was focusing on anyway. User X clicks on the first card to see some additional details of facility or network 4 as shown in FIG. 12, which depicts information (e.g., the current risk severity levels) that allows user X to evaluate at least one flow assurance risk associated with the current state of the corresponding network.

Figure 13:
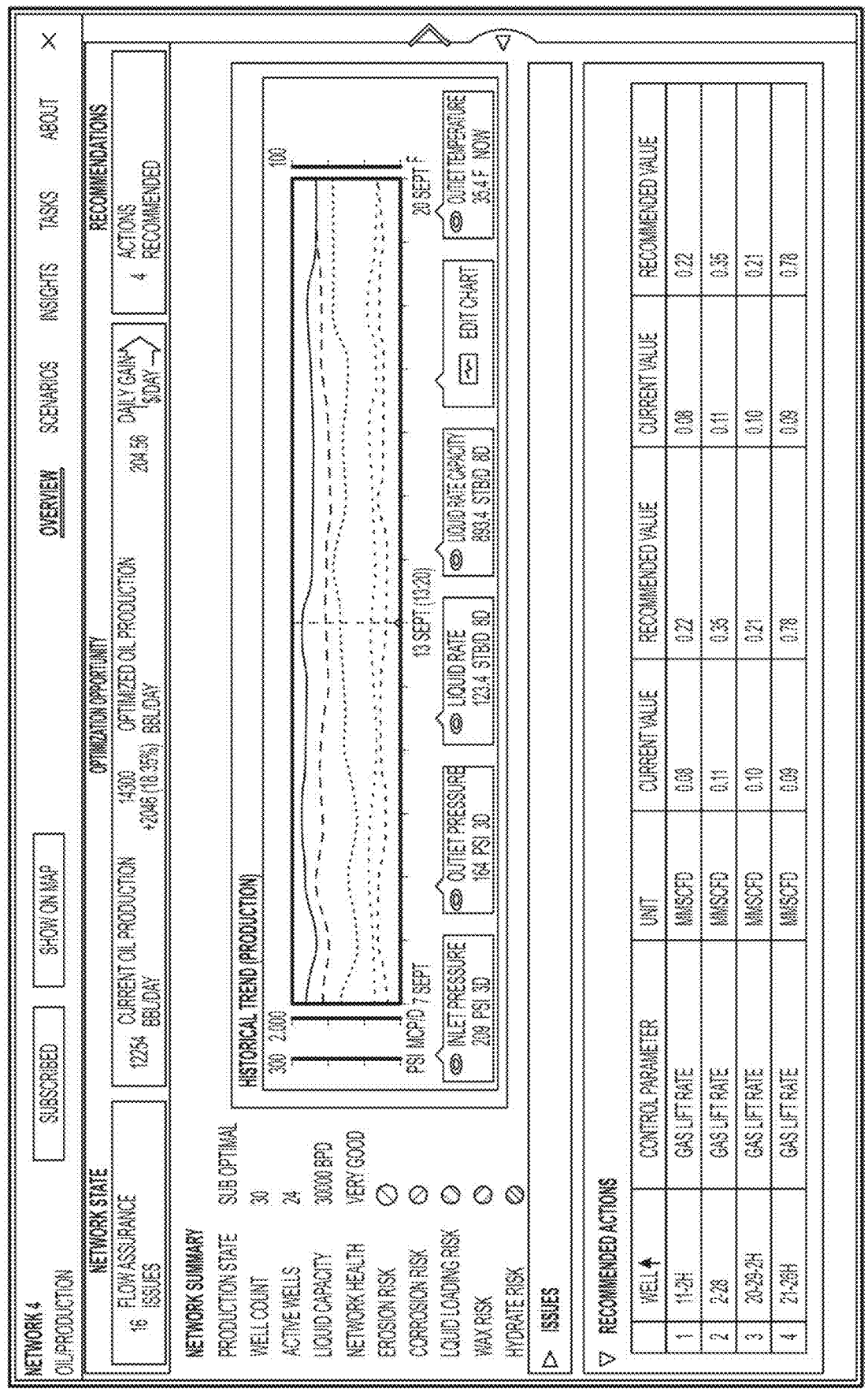

User X now wants to get to the point to see the actions that has been recommended by the system for the facility or network 4. User X clicks on the link of the asset shown under the side panel (Network 4 link above). This brings user X to the overview page as shown in FIG. 13. Here, user X can be presented with recommended actions (bottom window of FIG. 13).

Figure 14:
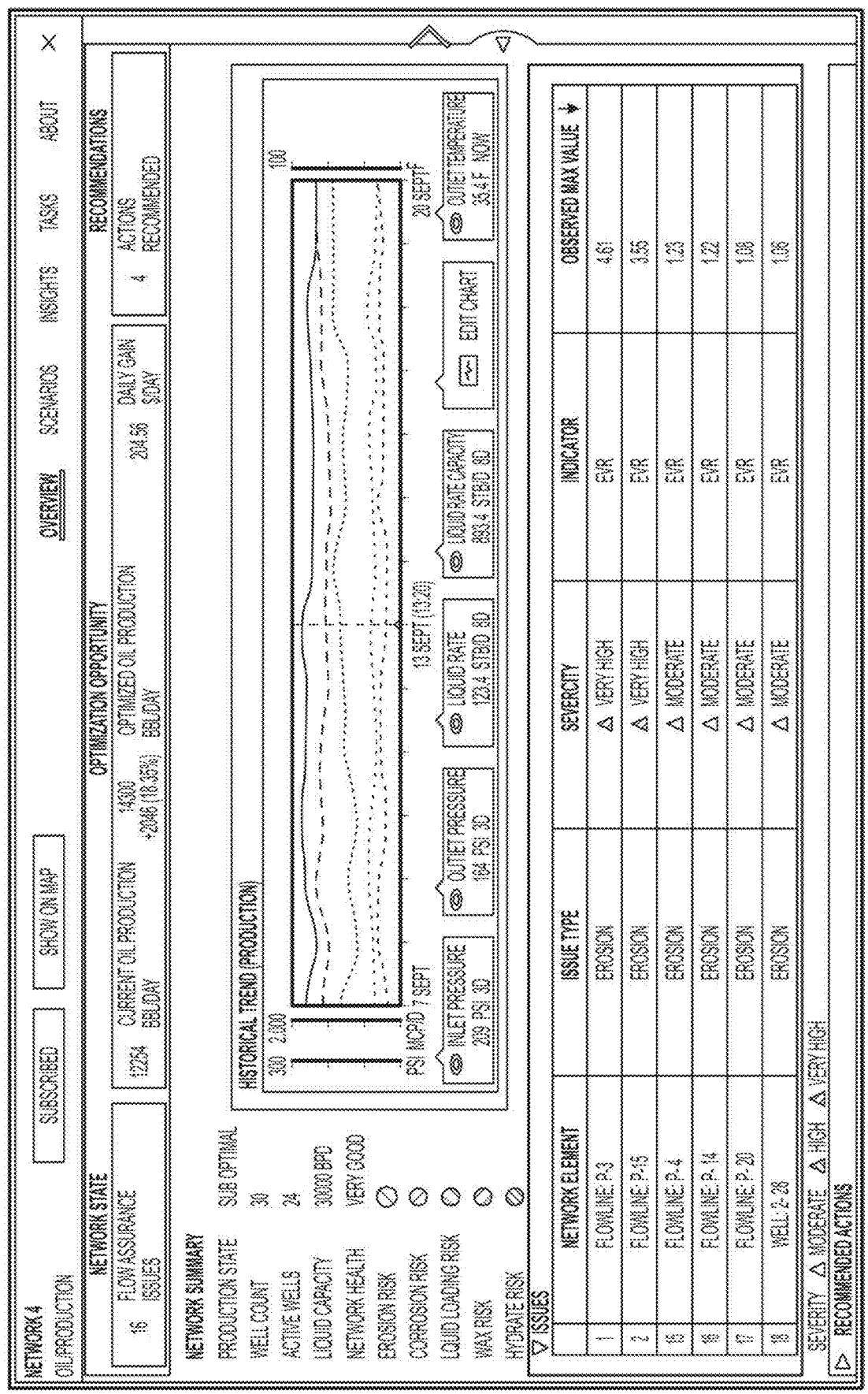

User X can also be presented with issues associated with various elements of the facility as shown in FIG. 14. Additionally, user X can be presented with a trend plot (middle window of FIG. 14) that shows the historical performance of a few important KPIs for the facility over time.

Figure 15:
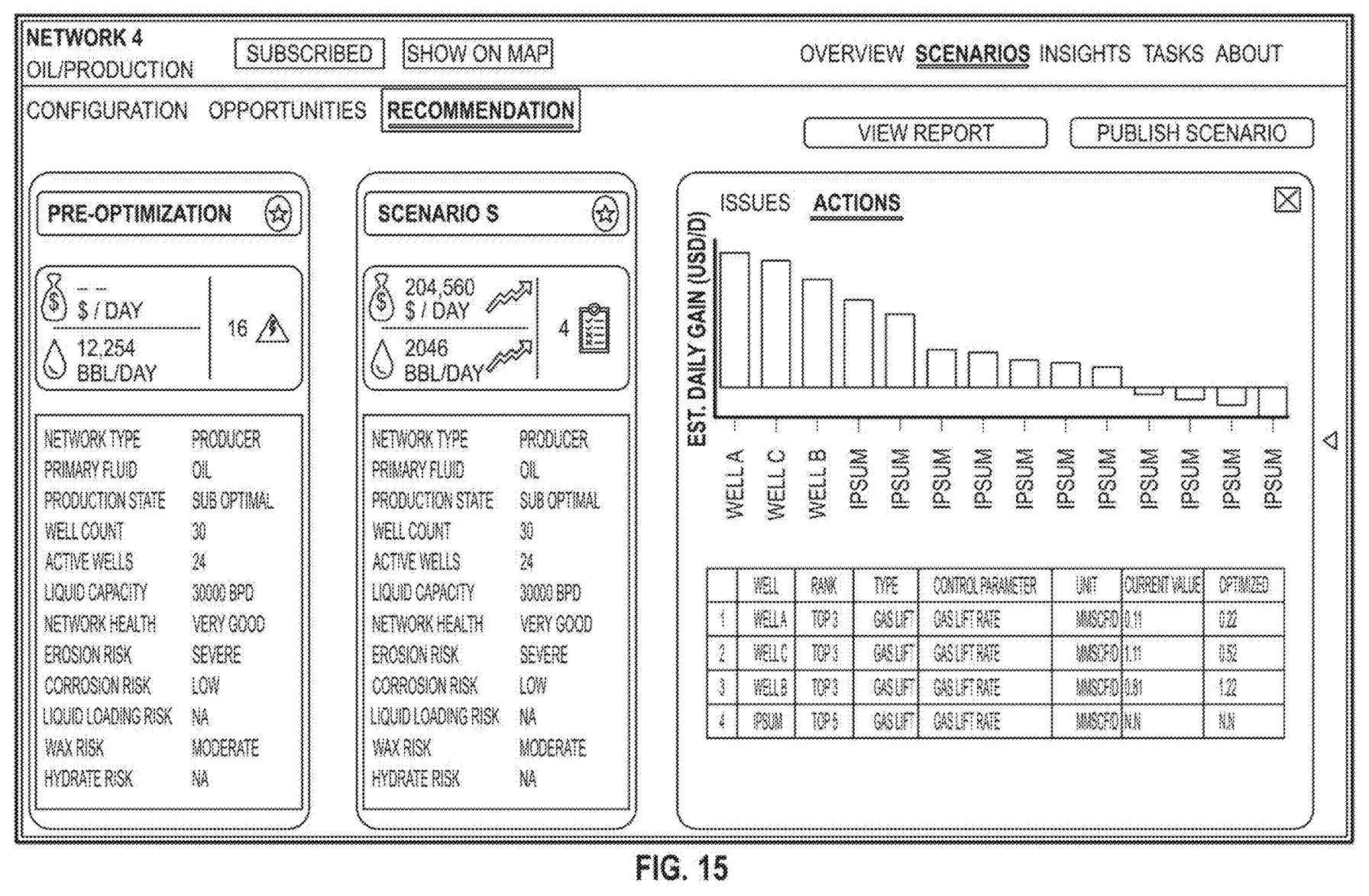

Because these recommended actions are obtained post evaluation of multiple scenarios, user X can be presented with details of the multiple what-if scenarios by selecting the scenario page from the top right menu. In response to this selection, user X is presented with the recommendation window of the scenario generator as shown in FIG. 15. By default, the highest rank scenario (Scenario S) gets automatically selected by the system and is presented for display initially in the recommendations window.

Figure 16:
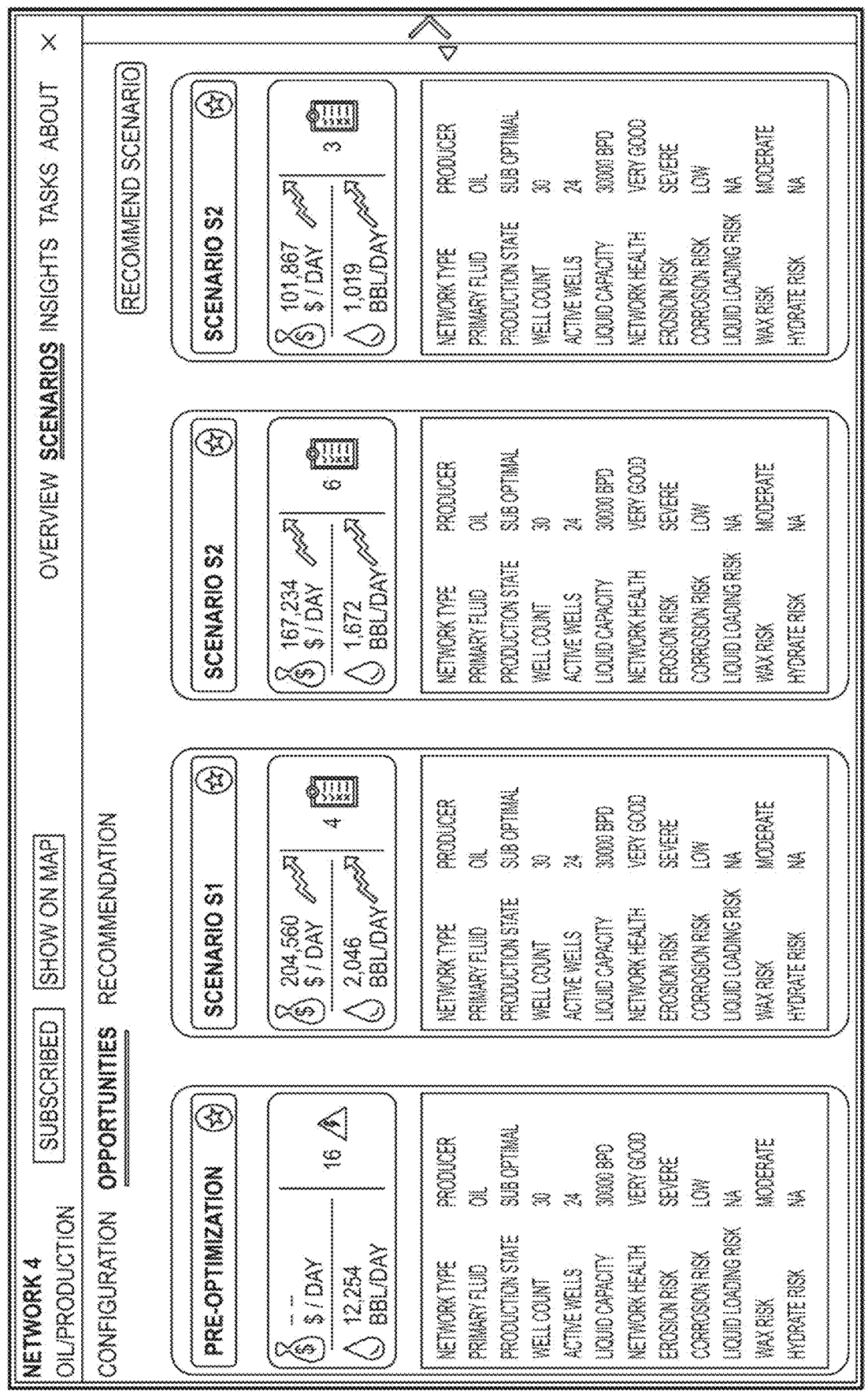

From the results, user X can determine that the what-if scenario S will not resolve the erosion risk and may want to evaluate other scenarios to see if he/she can find a better solution. In this case, user X can select the opportunities tab to present a window that summarizes the results for all of the what-if scenarios (S1, S2, etc.) as shown in FIG. 16. This result information includes information (e.g., predicted oil production per day and predicted value per day) that allows user X to evaluate the performance of the corresponding networks for each what-if scenario (S1, S2, etc.). The result information also includes information (e.g., the predicted risk severity levels) that allows user X to evaluate the different flow assurance risks for each what-if scenario (S1, S2, etc.).

Figure 17:
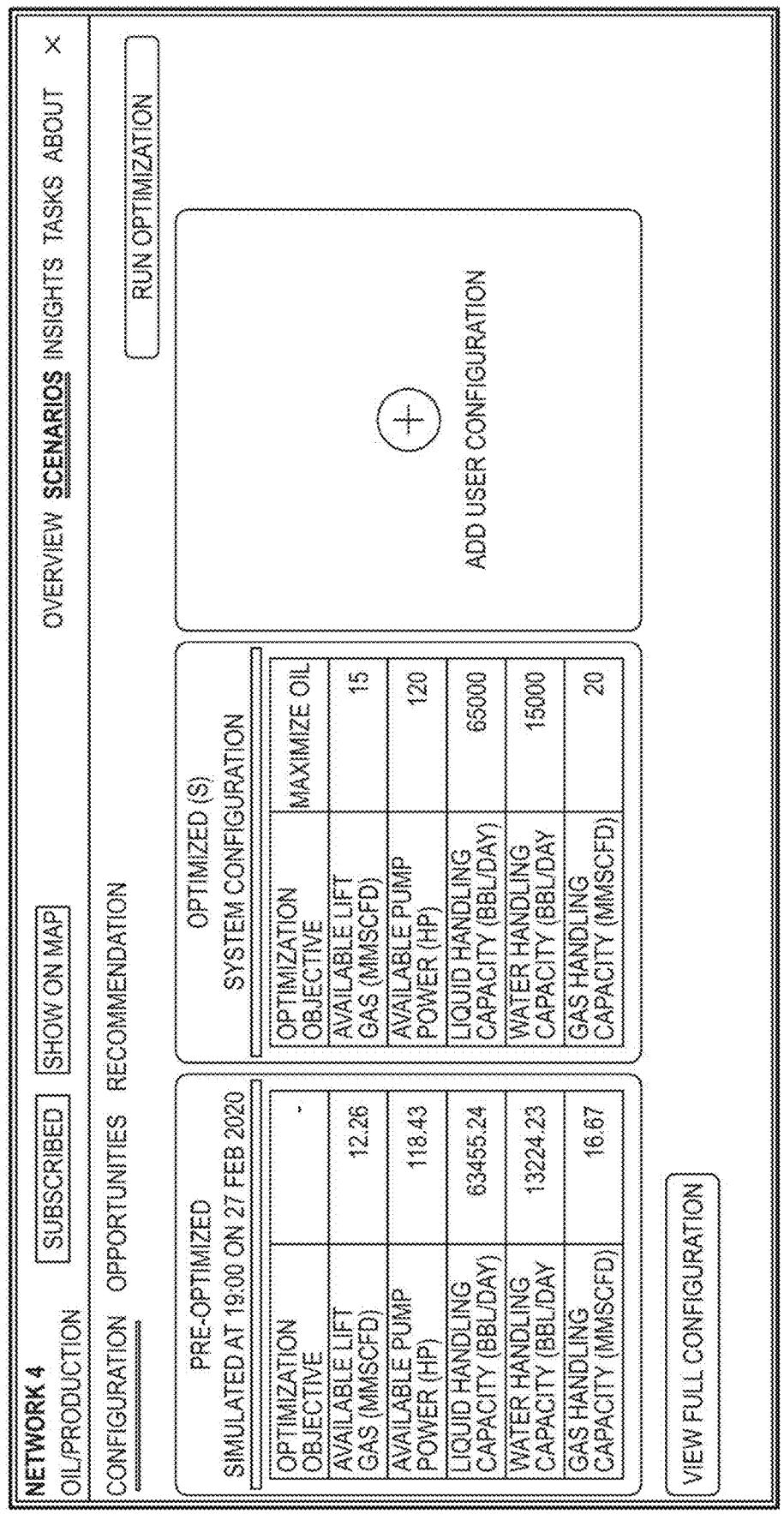

From the results of FIG. 16 user X can determine that all of these scenarios show some improvement in production, but none of them are actually able to manage erosion risk. In this case, user X can click on the configuration tab. In response to this selection, user X can be presented with the configuration window as shown in FIG. 17, which enables user X to view and possibly update a number of high-level parameters for configuring the what-if scenarios generated by the system. In the event that user X wants to access more detailed configuration parameters, user X can select the "view full configuration" tab in FIG. 17.

Figure 18:
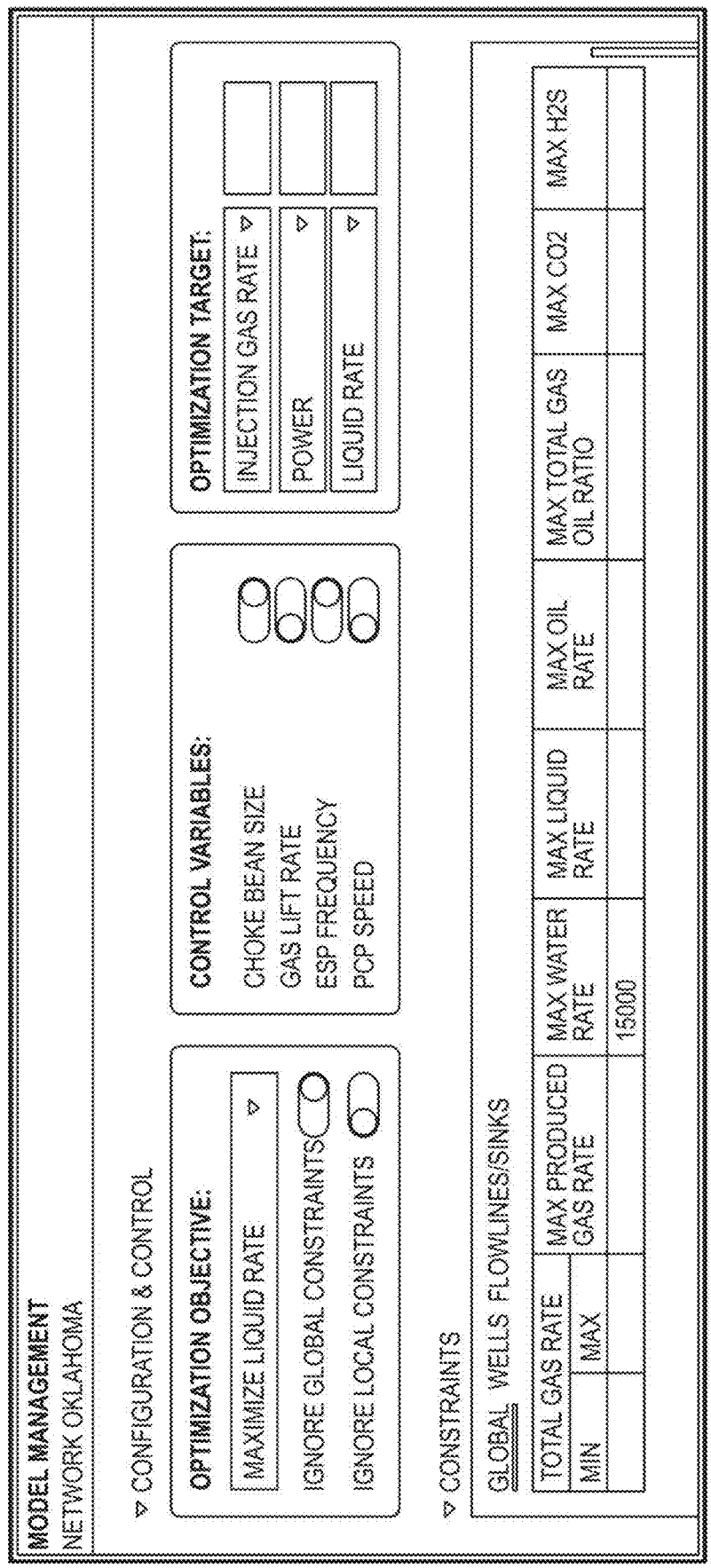
Figure 20:
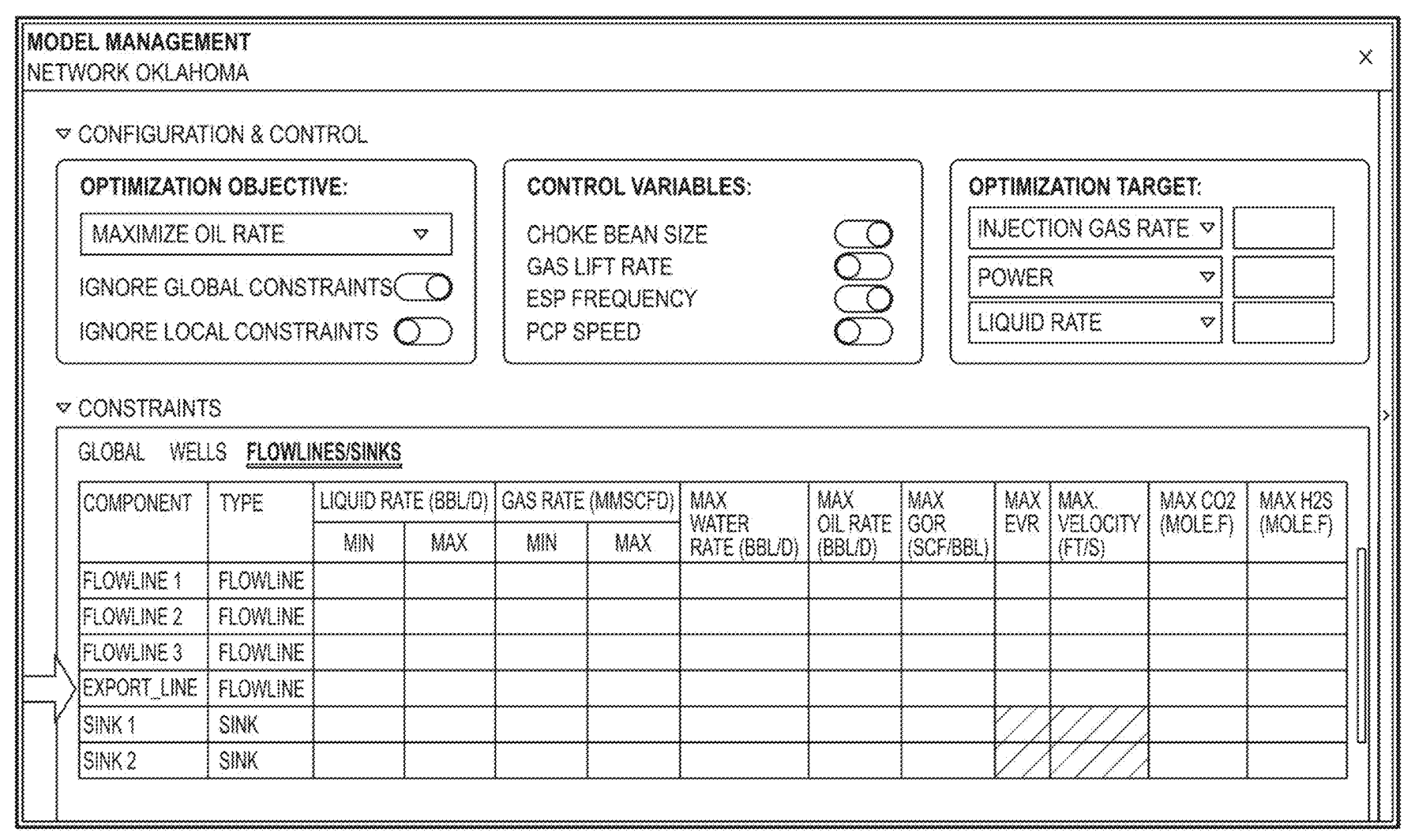

In response to this selection, user X can be presented with one or more detailed configuration windows as shown in FIGS. 18-20, which enables user X to view and possibly update a number of more-detailed parameters for configuring the what-if scenarios generated by the system. In embodiments, the more-detailed parameters can be one or more parameters related to objectives of the optimization (such as maximize liquid rate or maximize oil rate), one or more parameters related to variables for controlling operational aspects of the facility for the optimization, one or more parameters related to target parameters for the optimization (such as injection gas rate, liquid rate, power, etc.), one or more parameters related to global constraints for the optimization (such as minimum total gas rate, maximum total gas rate, maximum produced gas rate, maximum water rate, maximum liquid rate, maximum oil rate, maximum total gas oil ratio, maximum carbon dioxide, maximum hydrogen sulfide, etc. as shown in FIG. 18), one or more parameters related to well-specific constraints for the optimization (such as minimum and maximum values for gas lift rate, electrical submersible pump (ESP) frequency, progressive cavity pump (PCP) speed, Choke Bean Size; maximum casing head pressure; minimum and maximum power, maximum drawdown ((DD), minimum bubble point pressure margin, maximum Erosional Velocity Ratio (EVR), maximum flow velocity or flow rate, etc. as shown in FIG. 19), and one or more parameters that relate to flowline or sink-specific constraints for the optimization (such as minimum and maximum values for liquid rate and gas rate; maximum water rate, maximum oil rate; maximum gas-oil ratio (GOR), Erosional Velocity Ratio (EVR), maximum flow velocity or flow rate; maximum carbon dioxide, maximum hydrogen sulfide, etc. as shown in FIG. 20).

In reviewing the constraints for the export flowline of the facility that is experiencing severe erosion risk in the panel of FIG. 20, user X can see there are no constraints set for optimization to address this risk. User X can add a new constraint for this risk as illustrated in FIG. 21 and then navigate back to the scenario configuration window as shown in FIG. 22 (which is similar to the initial window of FIG. 16). In this window, user X can interact with elements of the window to add additional sets of optimization configuration parameters for a few what-if scenarios and finally run the optimization to generate opportunities which show the results of the what-if scenarios.

When the optimization is run, the simulation model(s) for the facility is(are) updated with the latest operational data coming from the field and then several parallel optimization runs are performed based on each set of configurations for the different what-if scenarios. The results of the different what-if scenarios are then compared and relatively ranked by looking into overall economics and risks, accounting for incremental gain in oil or gas, operation cost, lifting cost, hydraulic and flow assurance risks, etc. based on basic configurations that can be accessed via a side panel as shown in FIG. 23.

It is worth noting that subsequent to the user's update in the configuration for the erosion risk as illustrated in FIG. 21, all the opportunities presented are addressing the erosion issue. The highest-level results for these what-if scenarios (or opportunities) are presented as cards that are sorted according to rankings based on the results of the scenarios (i.e., economic value arising from change in production for the different scenarios) with the highest ranked card placed next to the pre-optimization card on the extreme left of the window as shown in FIG. 24.

Figure 24:
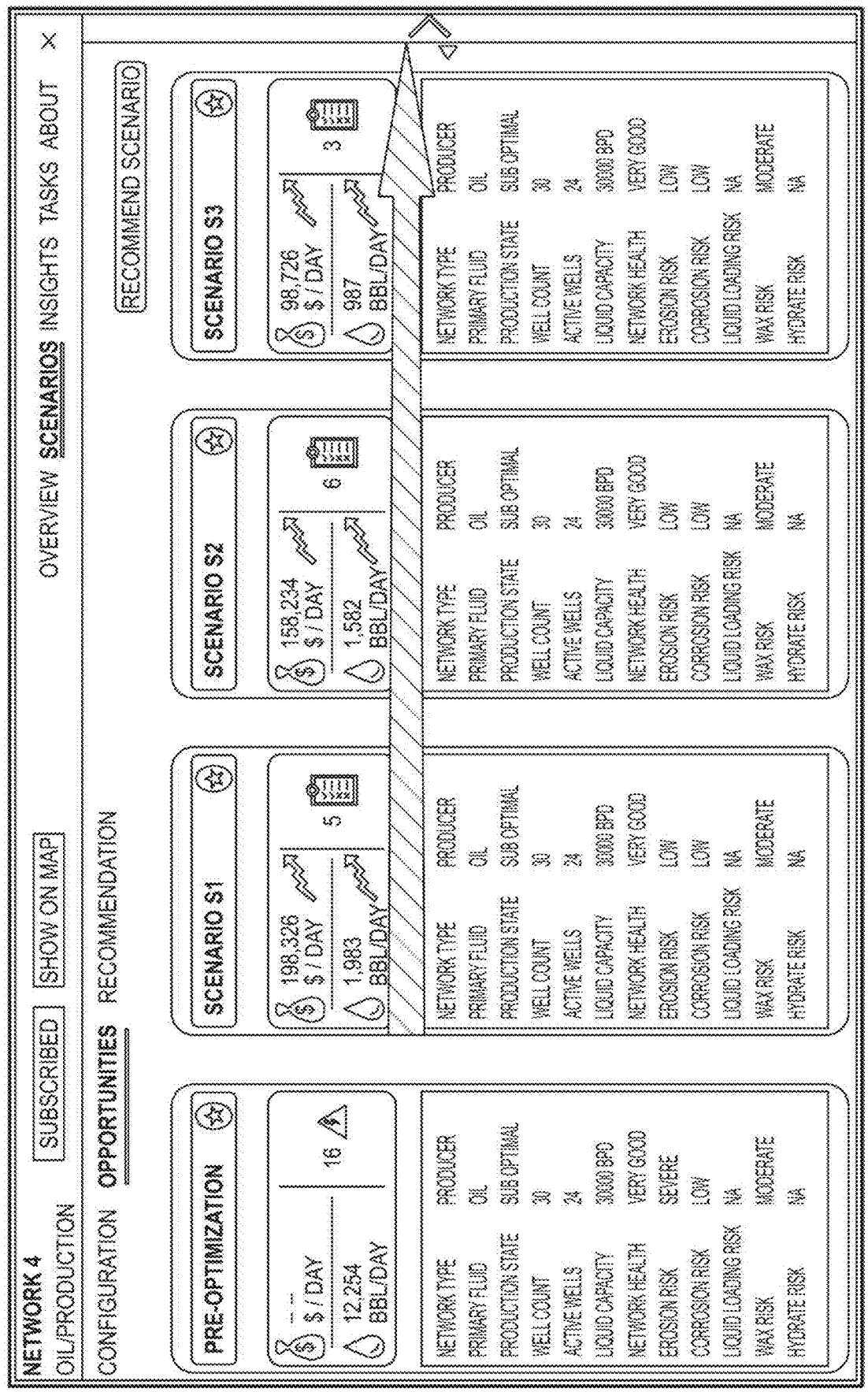
Figure 25:
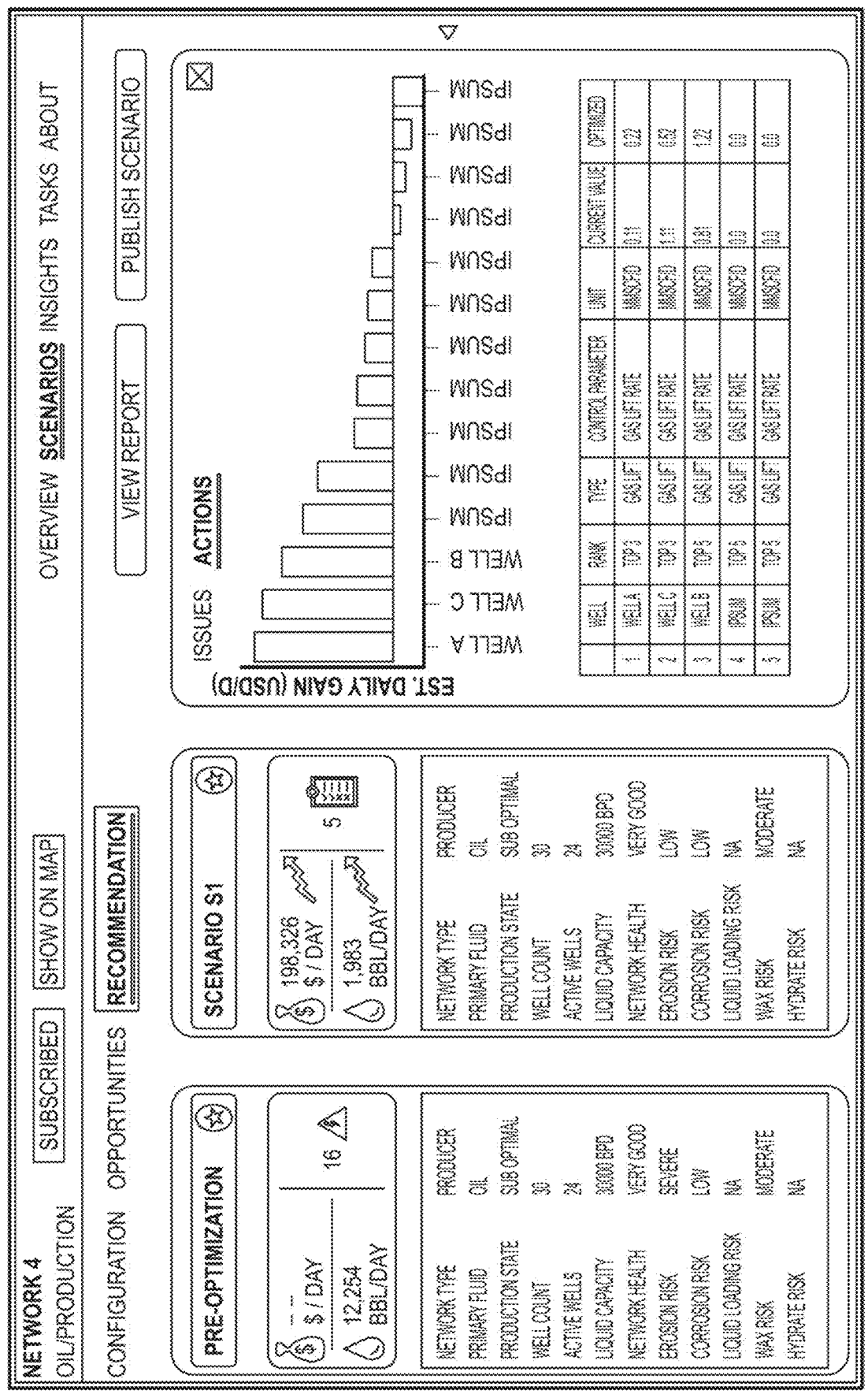
Figure 26:
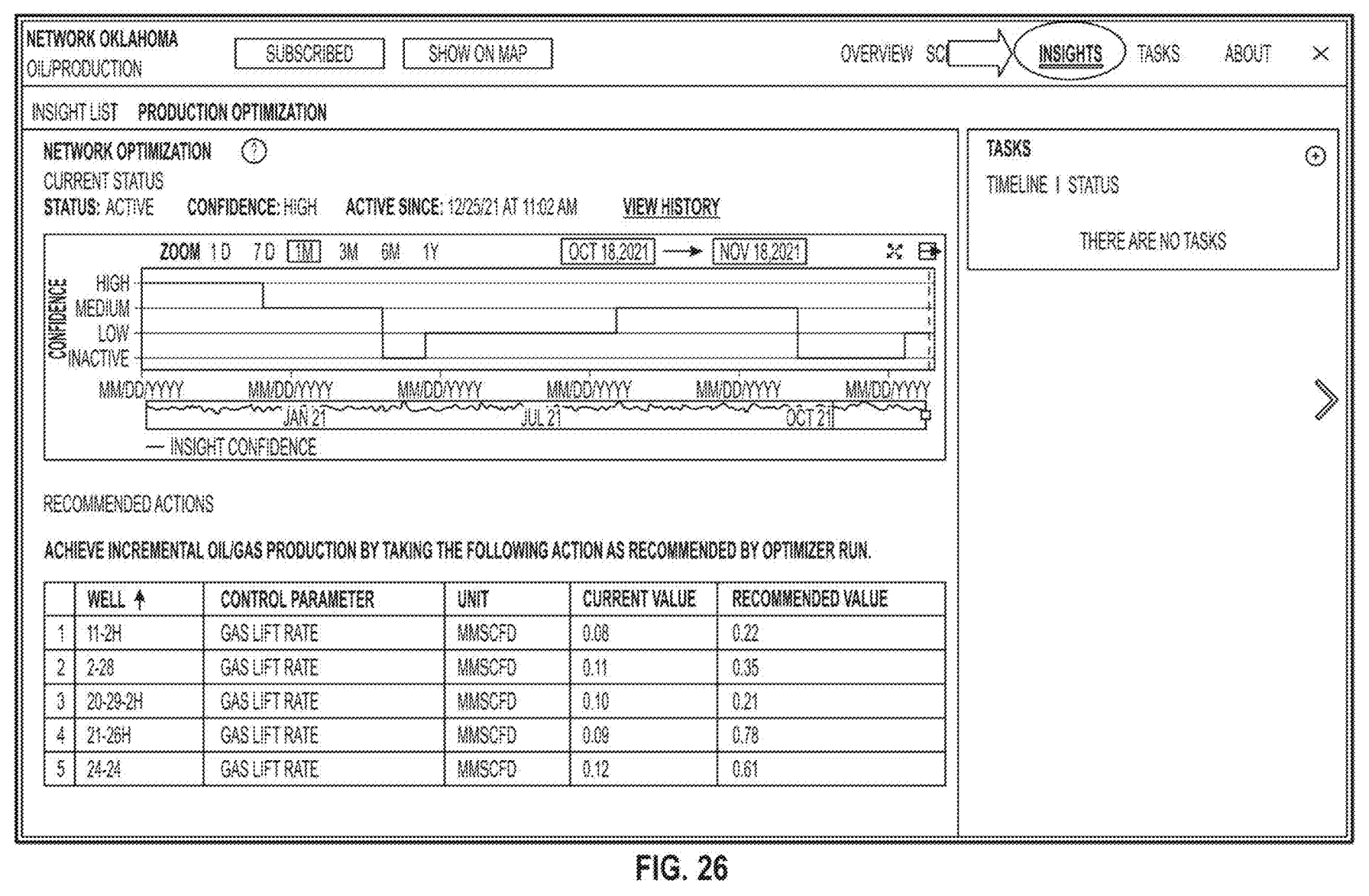

User X can select one of the what-if scenarios presented to the user, such as the highest ranked scenario S1 as shown in FIG. 24. In response to this selection, the recommendation window of the interface can be updated as shown in FIG. 25. Furthermore, user X can elect to publish the recommended scenario (in this case, scenario S1) by selecting the "Publish Scenario" button as shown. In response to such publication, the details of the recommended/published what-if scenario can be registered under the insights page of the application through insight services. User X can also access such details through the insight tab on the navigation bar. An example of the details of the insight tab is shown in FIG. 26, which depicts details for actions or tasks to take in operating the facility to follow the recommended/published optimization scenario.

At some point, user X can decide to create and register an action or task into the task management system of the application which follows the recommended/published optimization scenario. The resulting task can be displayed on the right-hand side of FIG. 26 (which shows no tasks).

After some time, user X receives a notification of issue resolution and the operation is back to normal. Reflecting on the journey of user X, it was triggered by system notification; however, instead of following an initial recommended action, the application allows user X to simulate and explore various options before selecting and implementing a final recommendation that is intended to address a flow assurance risk in the facility.

Optimization Workflow

Figure 27:
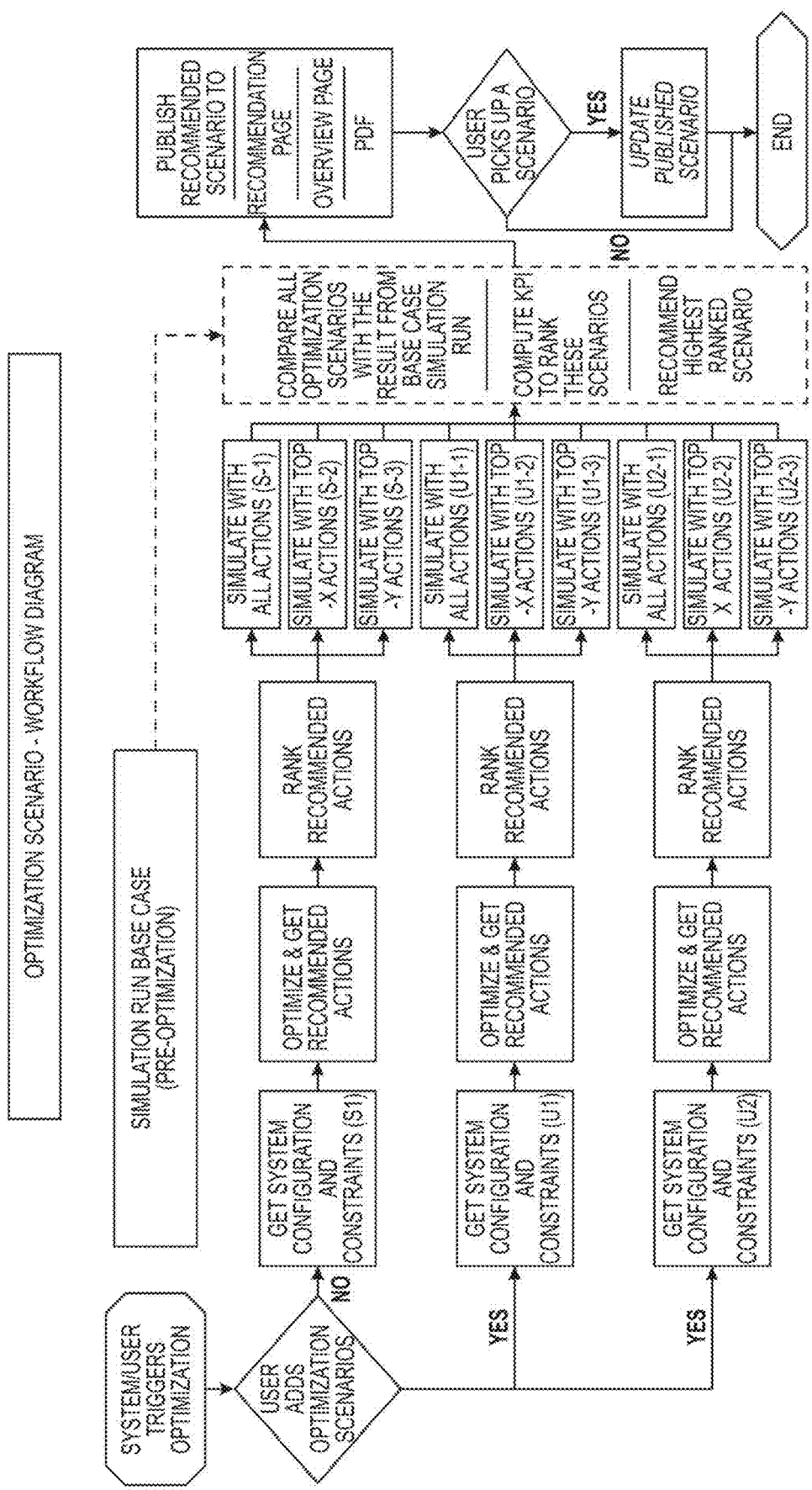
FIG. 27 depicts a workflow of the operations executed by the Hydrocarbon Flow Avatar that runs an optimization to generate opportunities which show the results of several what-if scenarios.

FIG. 27 depicts a workflow of the operations executed by the HCFA that runs an optimization to generate opportunities which show the results of several what-if scenarios. The optimization can be triggered automatically by the system or manually by a user. First, the HCFA runs a simulation of a base case representing the current state of the network(s) of oilfield facilities without any changes or updates applied thereto. Second, in the case that the user has not added any optimization scenario, the HCFA obtains the configuration parameters and constraints for a system-based optimization S1 and runs a simulation using the configuration parameters and constraints for a system-based optimization S1 to optimize the operation of the network(s) of oilfield facilities and obtain recommended actions that optimize the operation of the network(s) of oilfield facilities. The HCFA can then rank the recommended actions and run simulations of the network(s) of oilfield facilities for different parts (subsets) of the ranked recommended actions, such as using all of the recommended actions, or using the top x (e.g., top 5) recommended actions, or using the top y (e.g., top 10) recommended actions. Third, in the case that the user has added one or more optimization scenarios, the HCFA obtains the configuration parameters and constraints for each user-defined optimization (e.g., U1 or U2) and runs a simulation using the configuration parameters and constraints for each user-defined optimization (e.g., U1 or U2) to optimize the operation of the network(s) of oilfield facilities and obtain recommended actions that optimize the operation of the network(s) of oilfield facilities for each user-defined scenario. For each user-defined scenario, the HCFA can then rank the recommended actions and run simulations of the network(s) of oilfield facilities for different parts (subsets) of the ranked recommended actions, such as using all of the recommended actions, or using the top x (e.g., top 5) recommended actions, or using the top y (e.g., top 10) recommended actions. The HCFA can then be configured to evaluate and compare the simulation results for the base simulation, the simulation results for system-based scenario (S1) if and when executed, and the simulation results for user-defined based scenarios (e.g., U1 and U2) if and when executed. The evaluation can include computing one or more KPIs based on the simulation results of the relevant scenarios and ranking the relevant scenarios based on such KPIs. The evaluation can also include identifying or recommending or highlighting the highest ranked scenario (or multiple scenarios based on ranking), which can be presented to a user for review and analysis as described herein.

Ranking Scenarios

Figure 28:
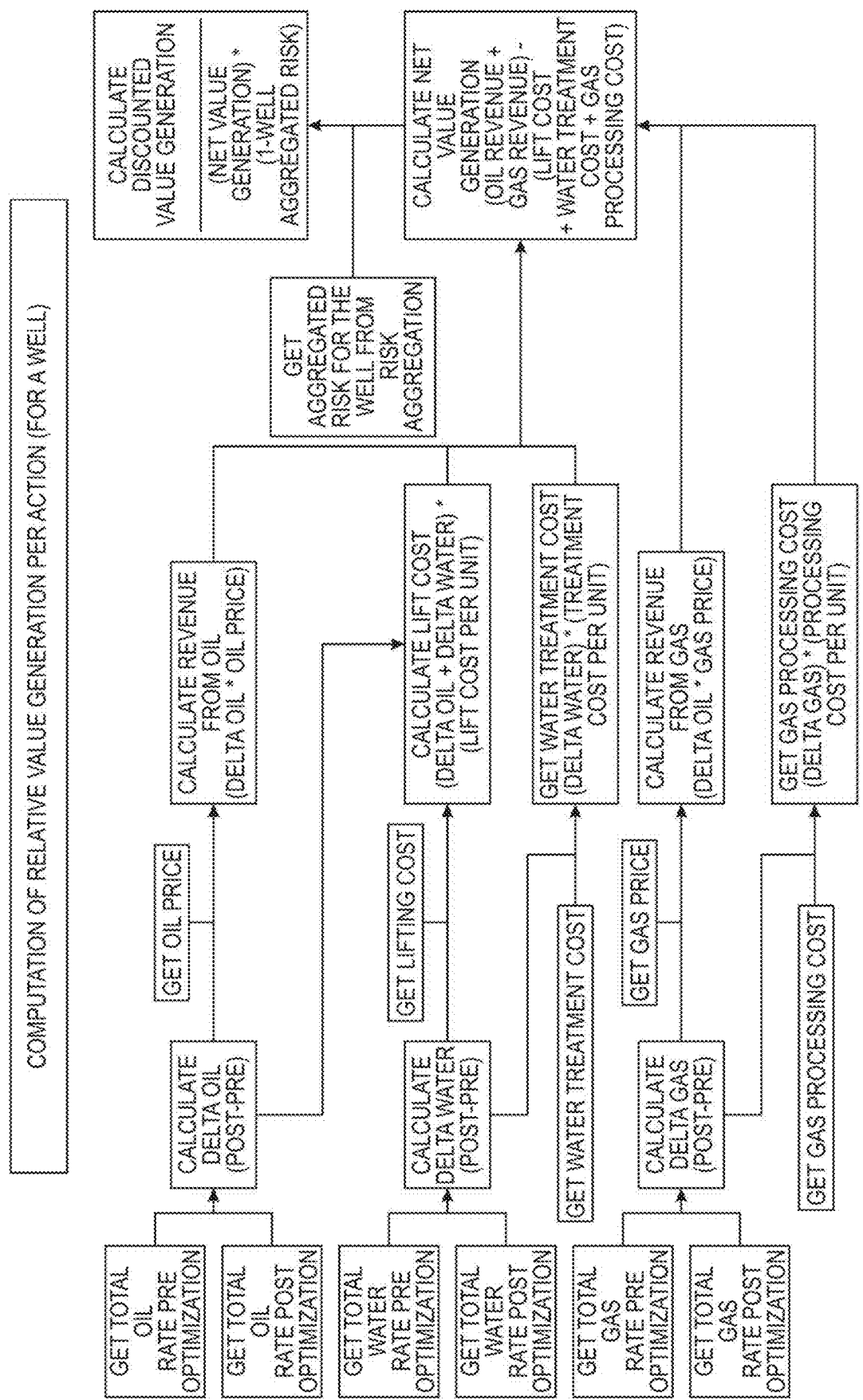
FIG. 28 depicts a workflow of the operations executed by the Hydrocarbon Flow Avatar in calculating a KPI for a what-if scenario.

FIG. 28 depicts a workflow of operations executed by the HCFA in calculating a KPI for an optimization scenario, e.g., an optimization scenario in the workflow of FIG. 27. In this workflow, the KPI is based on a net value that accounts for the predicted revenue increase for oil and gas produced from the network(s) of oilfield facilities that result from the optimization scenario and the predicted incremental costs associated therewith (including lift costs, water treatment costs, and gas processing costs) that result from the optimization scenario. The predicted revenue increase for oil produced from the network(s) of oilfield facilities that results from the optimization scenario can be based on the incremental production of oil from the network(s) of oilfield facilities that results from the optimization scenario and an oil price (for example, in $/barrel of oil). The oil price can be set by user input or another mechanism. The predicted revenue increase for gas produced from the network(s) of oilfield facilities that results from the optimization scenario can be based on the incremental production of gas from the network(s) of oilfield facilities that results from the optimization scenario and a gas price (for example, in $/cubic feet of gas). The gas price can be set by user input or another mechanism. The net value is discounted by a factor that accounts for the predicted aggregated risks for the optimization scenario. In embodiments, the aggregated risks can be predicted for a given optimization scenario according to the calculations described below with respect to use case D of FIG. 35 or use case E of FIG. 36. In embodiments, the KPI can be calculated by multiplying the net value by the difference (1—aggregated risk factor) as shown. This optimization analysis can be done on the production from a single well or on the production over a network of multiple wells.

Risk Interpretation and Aggregation

The HCFA can characterize one or more flow assurance risks related to the operation of the network(s) of oilfield facilities and present and display information representing such risk(s) to a user. In embodiments, such risks can be logically organized into five different use cases A to E as explained in the tables of FIGS. 29 and 30. Such flow assurance risks can relate to the current state of the network(s) of oilfield facilities, and thus can be calculated for the base case simulation in FIG. 27. Such flow assurance risks can also relate to the predicted state of the network(s) of oilfield facilities for the system-based optimization, and thus can be calculated for the system-based optimization in FIG. 27. Such flow assurance risks can also relate to the predicted state of the network(s) of oilfield facilities for the user-defined optimization(s), and thus can be calculated for each user-defined optimization in FIG. 27. The HCFA can be configured to enable a user to evaluate the flow assurance risks for the five different use cases to enable users to interpret specific risks as different elements of the network or over the entire network or aggregated risks at the different elements (or map points) of the network or over the entire network.

Figure 30:
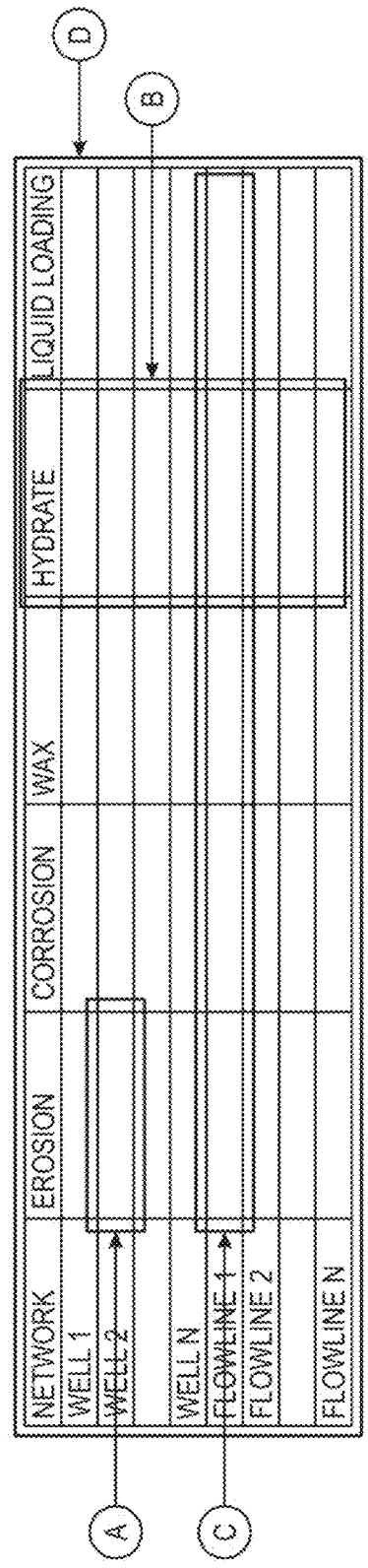
Figure 31:
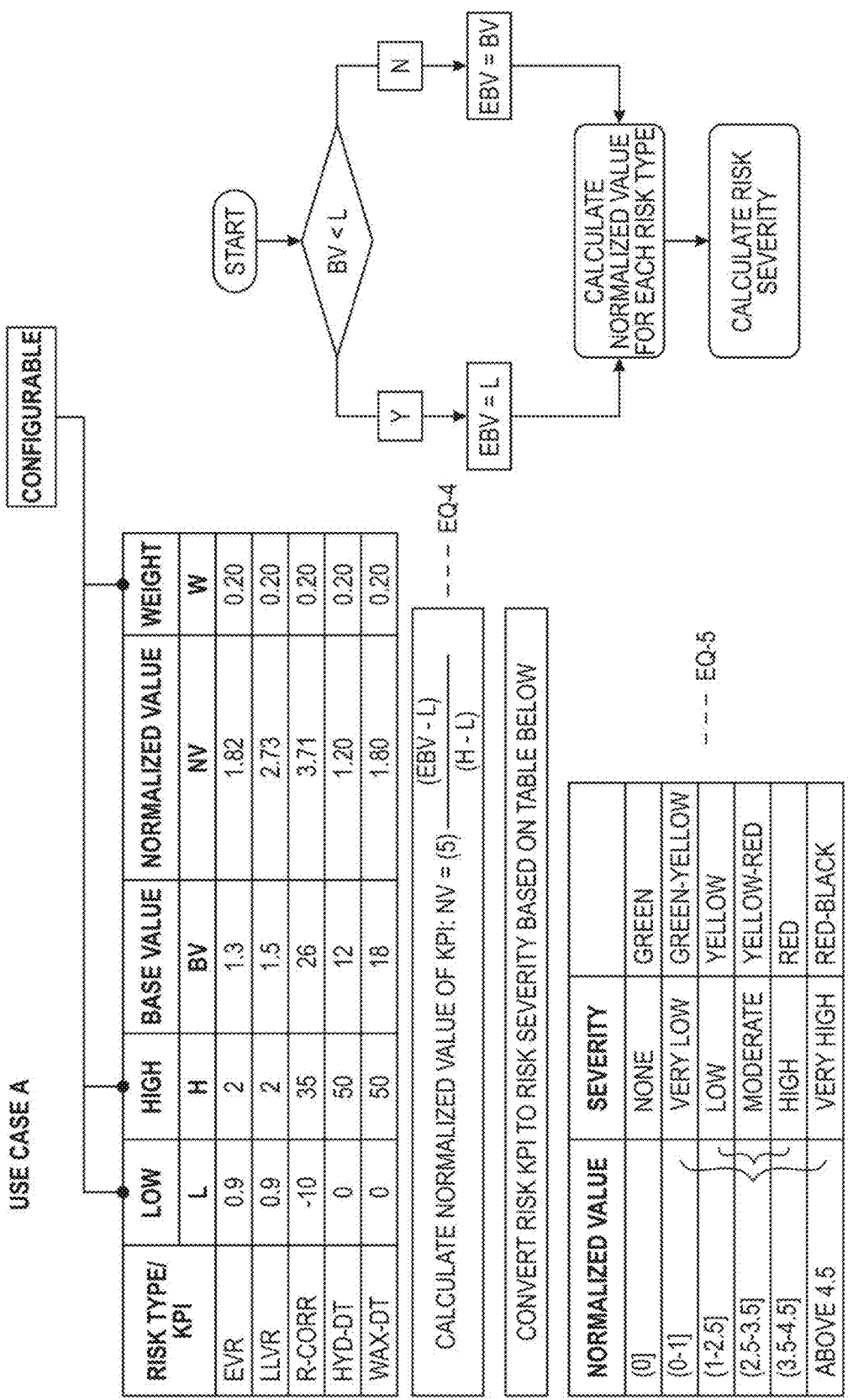
FIG. 31 is a schematic diagram that depicts operations for characterizing particular flow assurance risks at an element of the network (e.g., at a particular flowline or well) for the use case A of FIGS. 29 and 30.

FIG. 31 depicts operations for characterizing flow assurance risks at an element of the network (e.g., at a particular flowline or well) for the use case A of FIGS. 29 and 30. The flow assurance risks for the different risk types are represented by data values for a range of risk severity levels. The risk severity data value is derived from a normalized KPI value determined from an EBV value. The EBV value is based on a base value for the risk when the base value is greater than or equal to a low parameter value for the risk or based on the low parameter value when the base value is less than the low parameter value for the risk. The normalized KPI value in the range of 0 to 5 is determined from the EBV value and high and low parameter values for the risk according to Eqn. 4 of FIG. 31. The normalized KPI value is converted to a risk severity level (none, very low, low, moderate, high very high) according to the lookup table of Eqn. 5 in FIG. 31. For network-level analysis, the worst-case value of the risk severity for the elements of the network can be selected and attributable to the network as a whole.

FIG. 32 depicts operations for characterizing flow assurance risks for a network for the use case B of FIGS. 29 and 30. In this case, an average KPI for wells and a particular risk type is computed by averaging KPIs attributable to each well and the risk type over the number of wells in the network according to Eqn. 1 in FIG. 32. Similarly, an average KPI for flowlines and a particular risk type is computed by averaging KPIs attributable to each flowline and the risk type over the number of flowlines wells in the network according to Eqn. 2 in FIG. 32. The average KPI for wells and the particular risk type and the average KPI for flowlines and the particular risk type are combined by weight factors W and F according to Eqn. 3 in FIG. 32. The combined KPI value can be converted to a risk severity level (none, very low, low, moderate, high, very high) according to a lookup table similar to Eqn. 5 in FIG. 31.

Figure 33:
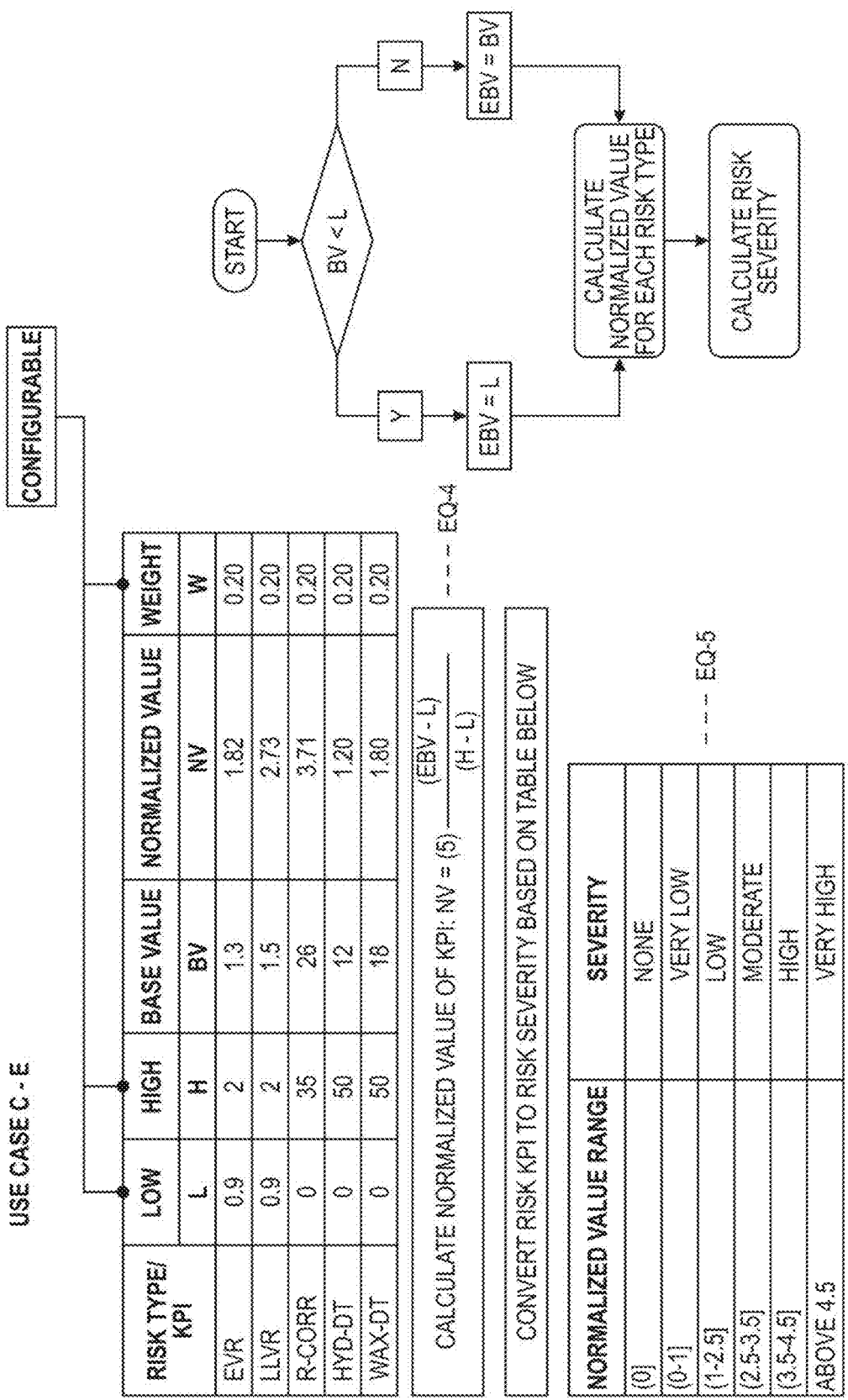
FIG. 33 is a schematic diagram that depicts operations for characterizing flow assurance risks for a network for any of the use cases C to E of FIGS. 29 and 30.

FIG. 33 depicts operations for characterizing flow assurance risks for a network for any of the use cases C to E of FIGS. 29 and 30. The flow assurance risks for the different risk types are represented by data values for a range of risk severity levels. The risk severity data value is derived from a normalized KPI value determined from an EBV value. The EBV value is based on a base value for the risk when the base value is greater than or equal to a low parameter value for the risk or based on the low parameter value when the base value is less than the low parameter value for the risk. The normalized KPI value in the range of 0 to 5 is determined from the EBV value and high and low parameter values for the risk according to Eqn. 4 of FIG. 33. The normalized KPI value is converted to a risk severity level (none, very low, low, moderate, high, very high) according to the lookup table of Eqn. 5 in FIG. 33.

FIG. 34 depicts operations for characterizing aggregated flow assurance risk across the different risk types for a particular element of the network for the use case C of FIGS. 29 and 30. The operations calculate nominal values for the particular element and the different risk types independently from one another according to the operations of FIG. 33, and then calculate an aggregate score for the particular element from the nominal values and weight factors for the different risk types according to Eqns. 6 and 7 of FIG. 34. The aggregated score is converted to a risk severity level (none, very low, low, moderate, high, very high) according to the lookup table of Eqn. 5 in FIG. 33.

Figure 35:
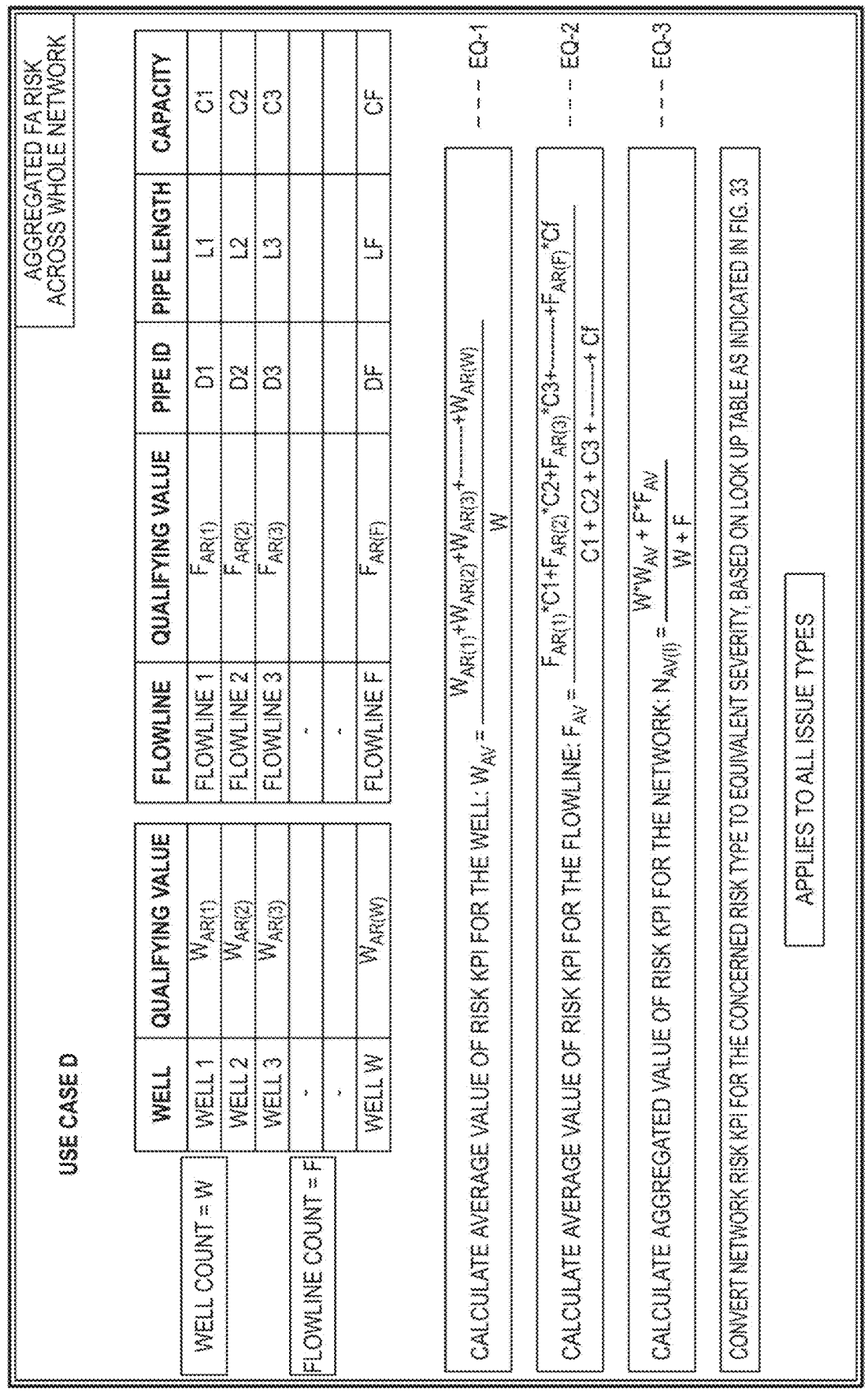
FIG. 35 is a schematic diagram that depicts operations for characterizing aggregated network-level flow assurance risk across different risk types for the use case D of FIGS. 29 and 30.

FIG. 35 depicts operations for characterizing aggregated network-level flow assurance risk across different risk types for the use case D of FIGS. 29 and 30. The operations calculate average risk values across the different risk types for the wells of the network and calculate an average value of risk for the wells of the network from these risk values and the number of wells in the network according to Eqn. 1 of FIG. 35. Similarly, the operations calculate average risk values across the different risk types for the flowlines of the network and calculate an average value of risk for the flowlines of the network from the risk values and the number of flowlines in the network according to Eqn. 2 of FIG. 35. The average risk for wells and the average risk for flowlines are combined by weight factors W and F according to Eqn. 3 in FIG. 35. The combined value can be converted to a risk severity level (none, very low, low, moderate, high, very high) according to a lookup table similar to Eqn. 5 in FIG. 33.

Figure 36:
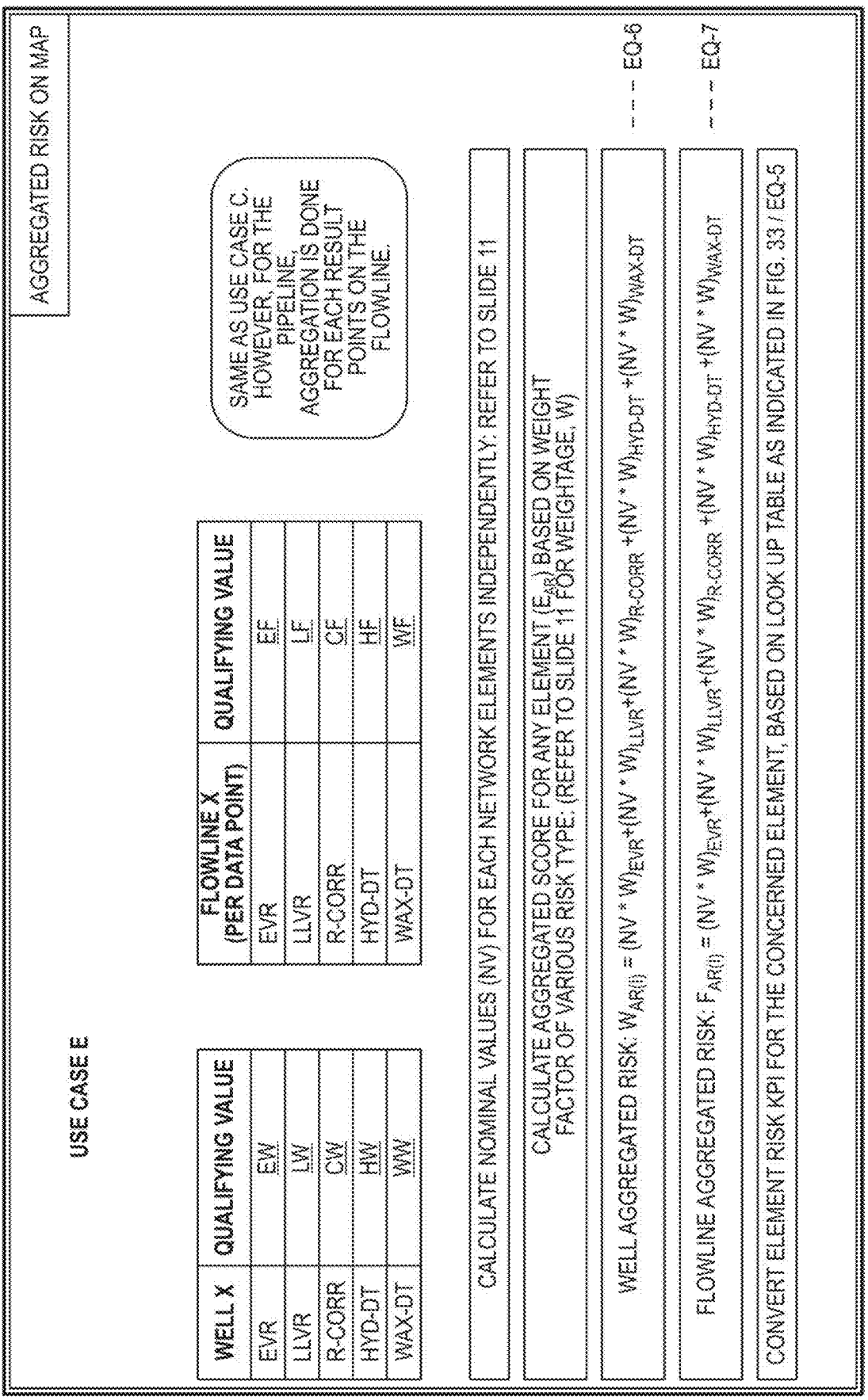
FIG. 36 is a schematic diagram that depicts operations for characterizing g aggregated flow assurance risk across different risk types for flowlines and flowline data points for use case E of FIGS. 29 and 30.

FIG. 36 depicts operations for characterizing aggregated flow assurance risk across different risk types for flowlines and flowline data points for use case E of FIGS. 29 and 30. The operations calculate nominal values of risk for data points along a flowline and the different risk types independently from one another according to the operations of FIG. 33, and then calculate an aggregate score for the flowline from the nominal values for the data points and weight factors for the different risk types according to Eqns. 6 and 7 of FIG. 36. The aggregated score is converted to a risk severity level (none, very low, low, moderate, high, very high) according to the lookup table of Eqn. 5 in FIG. 33.

In the majority of cases, the user will be able to take advantage of the automated workflow and analysis provided by the HCFA, which can further save time and money. Furthermore, the HCFA can be used to solve operational challenges.

The HCFA can provide value to the operator of a facility (or multiple facilities) as follows: (a) automated high-frequency operation of the HCFA can enable full awareness of the facility(ies) based on the latest data coming from the field and recommendations based on simulation models of the facility(ies); (b) the HCFA can provide access to a high-resolution map that allows the operator to visualize hydraulic and flow assurance data of production facilities including distribution of various risk types; (c) the HCFA can provide an integrated production optimization service that affords production enhancement opportunities conforming to latest operational state and optimization objectives; (d) the HCFA is capable of handling and managing wide ranges of local and global constraints to generate a solution that is realistic and feasible; and (e) the HCFA provides for comparative evaluation of a wide range of optimization scenarios to improve overall solution and all these to ensure efficient operation resulting in cost and time saving for the operation of the facility (ies).

Figure 37:
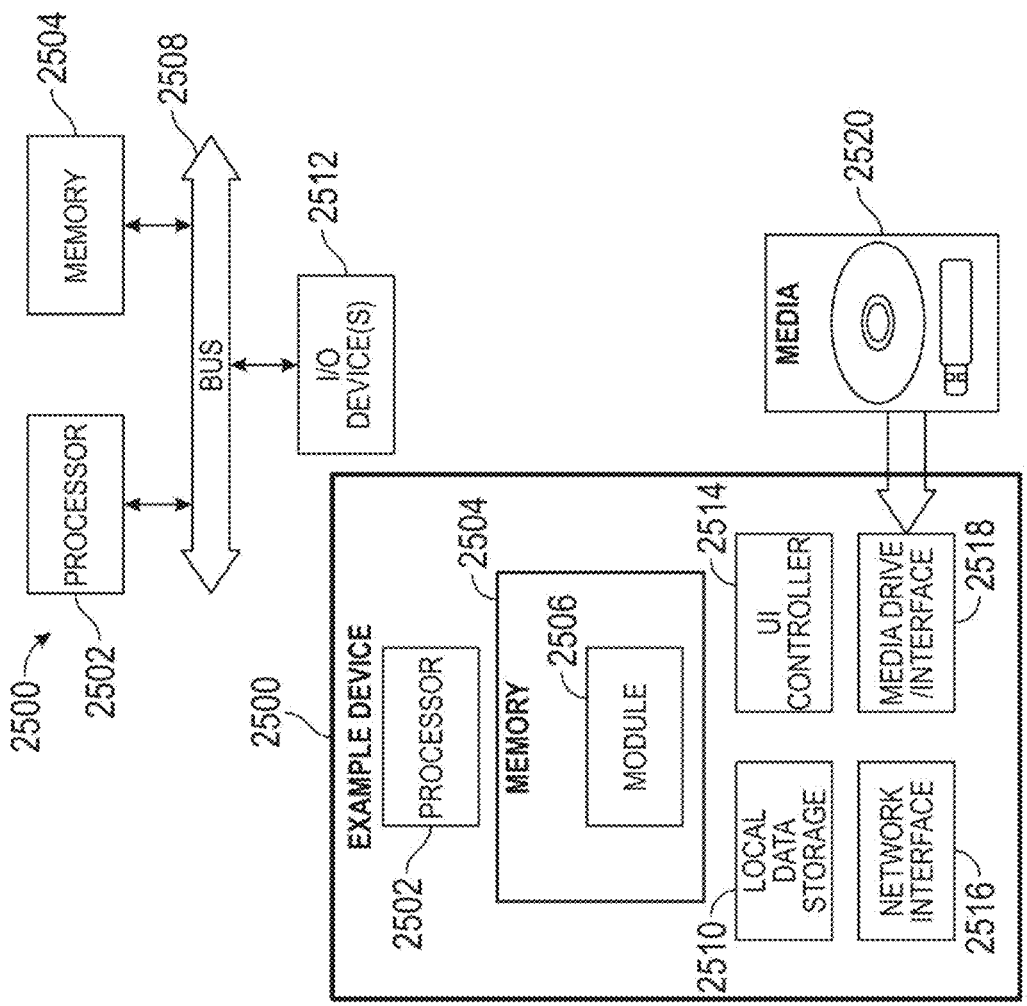
FIG. 37 is a schematic diagram of a computer system.

In some embodiments, the methods and systems of the present disclosure may involve a computing system. FIG. 37 illustrates an example computing system 2500, with a processor 2502 and memory 2504 that can be configured to implement various embodiments of the subject disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and nonvolatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claims expressly uses the words 'means for' together with an associated function.

What is claimed is:

1. A method for evaluating flow assurance issues and risks in at least one network of oilfield facilities, the method comprising:
   executing a digital avatar on a data processor, the digital avatar representing the at least one network of oilfield facilities during operation of the at least one network of oilfield facilities, wherein the digital avatar is configured to:
   i) receive real-time sensor data communicated from field sensors disposed within the at least one network of oilfield facilities;
   ii) construct at least one model of the at least one network of oilfield facilities from the real-time sensor data;
   iii) configure at least one simulator to use the model of ii) to predict fluid flow through the at least one network of oilfield facilities for at least one what-if scenario, wherein configuring the at least one simulator comprises selecting at least one configuration parameter for the what-if scenario;
   iv) present for display a user interface that enables a user to evaluate performance and at least one flow assurance risk or issue associated with the at least one network of oilfield facilities for the at least one what-if scenario, wherein evaluating the performance and at least one flow assurance risk or issue comprises:
   determining a first average value of a risk performance indicator for a well;
   determining a second average value of the risk performance indicator for a flowline in communication with the well;
   determining an aggregated value of the risk performance indicator for the at least one network of oilfield activities based upon the first and second averages; and
   determining a severity level of the at least one flow assurance risk or issue based upon the aggregated value; and
   v) recommend to an operator a set of actions or tasks to address the at least one flow assurance risk or issue and optimize a flow of produced hydrocarbons in the at least one network of oilfield facilities.

2. The method according to claim 1, wherein:
the at least one model comprises a production system data model that is part a digital twin of the at least one network of oilfield facilities.

3. The method according to claim 1, wherein:
the at least one simulator of iii) comprises a computational-based simulator configured to simulate fluid flow through the at least one network of oilfield facilities, including fluid flow through a reservoir and into the well and through the well to surface facilities and through the surface facilities to one or more designated endpoints.

4. The method according to claim 1, wherein:
the display of iv) includes information representing at least one flow assurance risk or issue for a given what-if scenario, wherein the information is based on a value of at least one KPI derived from the predicted fluid flow of iii) for the given what-if scenario.

5. The method according to claim 1, wherein:
the digital avatar is further configured to present for display a user interface that enables a user to define the at least one configuration parameter.

6. The method according to claim 5, wherein:
the at least one configuration parameter is selected from the group consisting of a) at least one parameter related to objectives of optimization including maximizing a liquid rate or maximizing an oil rate, b) at least one parameter related to variables for controlling operational aspects of the facility for the optimization, c) at least one parameter related to target parameters for the optimization including an injection gas rate, a liquid rate, and/or power, d) at least one parameter related to global constraints for the optimization including a minimum total gas rate, a maximum total gas rate, a maximum produced gas rate, a maximum water rate, a maximum liquid rate, a maximum oil rate, a maximum total gas oil ratio, a maximum carbon dioxide, and/or a maximum hydrogen sulfide, e) at least one parameter related to well-specific constraints for the optimization including minimum and maximum values for gas lift rate, an electrical submersible pump (ESP) frequency, a progressive cavity pump (PCP) speed, a Choke Bean size, a maximum casing head pressure, minimum and maximum power, a maximum drawdown ((DD), a minimum bubble point pressure margin, a maximum Erosional Velocity Ratio (EVR), and/or a maximum flow velocity or flow rate, and f) one or more parameters that relate to flowline or sink-specific constraints for the optimization including minimum and maximum values for a liquid rate and a gas rate, a maximum water rate, a maximum oil rate, a maximum gas-oil ratio (GOR), an Erosional Velocity Ratio (EVR), a maximum flow velocity or flow rate, and/or a maximum carbon dioxide, maximum hydrogen sulfide.

7. The method according to claim 1, wherein:
the display of iv) includes information representing economic value of incremental hydrocarbon production that results from the at least one what-if scenario.

8. The method according to claim 7, wherein:
the economic value of incremental hydrocarbon production for a given what-if scenario is determined from i) price of oil and/or gas, ii) production costs, and iii) a discount factor based on at least one flow assurance risk or issue for the given what-if scenario.

9. The method according to claim 7, wherein:
the at least one simulator of iii) is configured to predict fluid flow through the at least one network of oilfield facilities for a plurality of different what-if scenarios; and
the digital avatar is configured to a) rank the plurality of different what-if scenarios based on the economic value of incremental hydrocarbon production resulting from the plurality of different what-if scenarios and b) display information representing at least one flow assurance risk or issue together with the economic value of incremental hydrocarbon production for different what-if scenarios in an order or arrangement or appearance based on the ranking of the different what-if-scenarios.

10. The method according to claim 1, wherein:
the digital avatar is configured to characterize at least one flow assurance risk related to the operation of the at least one network of oilfield facilities and present and display information representing the at least one flow assurance risk to a user.

11. The method according to claim 10, wherein:
the at least one flow assurance risk relates to current state of the at least one network of oilfield facilities; or
the at least one flow assurance risk relates to predicted state of the at least one network of oilfield facilities for a system-based what-if scenario; or
the at least one flow assurance risk relates to predicted state of the at least one network of oilfield facilities for at least one user-defined what-if scenario.

12. Method according to claim 10, wherein:
the at least one flow assurance risk characterizes one or more particular risk types at a particular flowline or well; or
the at least one flow assurance risk characterizes a particular risk type over a number of wells and flowlines; or
the at least one flow assurance risk characterizes aggregated flow assurance risk across different risk types for a particular flowline or well; or
the at least one flow assurance risk characterizes aggregated network-level flow assurance risk across different risk types; or
the at least one flow assurance risk characterizes aggregated flow assurance risk across different risk types for flowlines and flowline data points.

13. The method according to claim 10, wherein:
the at least one flow assurance risk is characterized by data that represents severity of a flow assurance risk.

14. The method according to claim 1, wherein the data processor is part of a cloud computing environment.

15. A system configured to evaluate flow assurance issues and risks in at least one network of oilfield facilities, the system comprising:
a digital avatar executing on a data processor, wherein the digital avatar represents the at least one network of oilfield facilities during operation of the at least one network of oilfield facilities, wherein the digital avatar is configured to
i) receive real-time sensor data communicated from field sensors disposed within the at least one network of oilfield facilities;
ii) construct at least one model of the at least one network of oilfield facilities from the real-time sensor data;
iii) configure at least one simulator to use the model of ii) to predict fluid flow through the at least one network of oilfield facilities for at least one what-if scenario, wherein configuring the at least one simulator comprises selecting one or more parameters for the what-if scenario;
iv) present for display a user interface that enables a user to evaluate performance and at least one flow assurance risk or issue associated with the at least one network of oilfield facilities for the at least one what-if scenario, wherein evaluating the performance and at least one flow assurance risk or issue comprises:
determining a first average value of a risk performance indicator for a well;
determining a second average value of the risk performance indicator for a flowline in communication with the well;
determining an aggregated value of the risk performance indicator for the at least one network of oilfield activities based upon the first and second averages; and
determining a severity level of the at least one flow assurance risk or issue based upon the aggregated value; and
v) recommend to an operator a set of actions or tasks to address the at least one flow assurance risk or issue and optimize a flow of produced hydrocarbons in the at least one network of oilfield facilities.

16. The system according to claim 15, wherein:
the display of iv) includes information representing at least one flow assurance risk or issue for a given what-if scenario, wherein the information is based on the value of at least one KPI derived from the predicted fluid flow of iii) for the given what-if scenario; and/or
the display of iv) includes information representing economic value of incremental hydrocarbon production that results from a given what-if scenario; and/or the at least one simulator of iii) is configured to predict fluid flow through the at least one network of oilfield facilities for a plurality of different what-if scenarios, and the digital avatar is configured to a) rank the plurality of different what-if scenarios based on the economic value of incremental hydrocarbon production resulting from the plurality of different what-if scenarios and b) display information representing at least one flow assurance risk or issue together with the economic value of incremental hydrocarbon production for different what-if scenarios in an order or arrangement or appearance based on the ranking of the different what-if-scenarios.

17. A method implemented by a data processor for evaluating flow assurance issues and risks in at least one network of oilfield facilities, the method comprising:
   i) receiving real-time sensor data communicated from field sensors disposed within the at least one network of oilfield facilities;
   ii) constructing at least one model of the at least one network of oilfield facilities from the real-time sensor data;
   iii) configuring at least one simulator to use the model of ii) to predict fluid flow through the at least one network of oilfield facilities for at least one what-if scenario, wherein configuring the at least one simulator comprises selecting one or more parameters for the what-if scenario;
   iv) presenting for display a user interface that enables a user to evaluate performance and at least one flow assurance risk or issue associated with the at least one network of oilfield facilities for the at least one what-if scenario, wherein evaluating the performance and at least one flow assurance risk or issue comprises:
      determining a first average value of a risk performance indicator for a well;
      determining a second average value of the risk performance indicator for a flowline in communication with the well;
      determining an aggregated value of the risk performance indicator for the at least one network of oilfield activities based upon the first and second averages; and
      determining a severity level of the at least one flow assurance risk or issue based upon the aggregated value; and
   v) recommending to an operator a set of actions or tasks to address the at least one flow assurance risk or issue and optimize a flow of produced hydrocarbons in the at least one network of oilfield facilities.

18. The method according to claim 1, wherein the at least one configuration parameter comprises an injection gas rate into the well, a frequency of an electrical submersible pump (ESP) in the well, a speed of a progressive cavity pump, a size of a choke bean, a pressure of a casing head, or a combination thereof.

19. The method according to claim 1, wherein the aggregated value comprises:
   multiplying the first average value and a first weighting factor to produce a first product;
   multiplying the second average value and a second weighting factor to produce a second product;
   adding the first and second products to produce a first sum;
   adding the first and second weighting factors to produce a second sum; and
   dividing the first sum by the second sum to produce the aggregated value.

20. The method according to claim 1, wherein evaluating the performance and at least one flow assurance risk or issue also comprises:
   determining first nominal values for the well in the at least one network of oilfield facilities;
   determining second nominal values for the flowline in the at least one network of oilfield facilities;
   determining a first aggregate score for the well based upon the nominal values and a plurality of first weight factors, wherein the first weight factors are related to erosion, corrosion, hydrate formation, and wax formation;
   determining a second aggregate score for the flowline based upon the nominal values and a plurality of second weight factors, wherein the second weight factors are related to the erosion, the corrosion, the hydrate formation, and the wax formation; and
   determining a severity level of the at least one flow assurance risk or issue based upon the first and second aggregated values.

* * * * *